(12) United States Patent  (10) Patent No.: US 9,930,648 B2
Frenne et al.  (45) Date of Patent: Mar. 27, 2018

(54) METHODS AND ARRANGEMENTS FOR TRANSMITTING AND RECEIVING CONTROL INFORMATION

(71) Applicant: Telefonaktiebolaget LM Ericsson (publ), Stockholm (SE)

(72) Inventors: Mattias Frenne, Uppsala (SE); Jung-Fu Cheng, Fremont, CA (US); Johan Furuskog, Stockholm (SE); Christian Hoymann, Aachen (DE); Havish Koorapaty, Saratoga, CA (US); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 990 days.

(21) Appl. No.: 13/701,584

(22) PCT Filed: Oct. 24, 2012

(86) PCT No.: PCT/SE2012/051145
    § 371 (c)(1),
    (2) Date: Dec. 3, 2012

(87) PCT Pub. No.: WO2013/070145
    PCT Pub. Date: May 16, 2013

(65) Prior Publication Data
    US 2014/0050159 A1    Feb. 20, 2014

Related U.S. Application Data

(60) Provisional application No. 61/591,929, filed on Jan. 29, 2012, provisional application No. 61/556,557, filed on Nov. 7, 2011.

(51) Int. Cl.
    *H04W 72/04* (2009.01)
    *H04L 5/00* (2006.01)

(52) U.S. Cl.
    CPC ......... *H04W 72/042* (2013.01); *H04L 5/0053* (2013.01)

(58) Field of Classification Search
    USPC ........................................................ 370/329
    See application file for complete search history.

(56) References Cited

U.S. PATENT DOCUMENTS

2007/0263586 A1* 11/2007 You et al. .................... 370/342
2009/0130985 A1*  5/2009 Lee ..................... H04L 27/2608
                                                     455/67.11

(Continued)

OTHER PUBLICATIONS

Samsung, DL Control Signaling Enhancements (R1-113100), Oct. 10-14, 2011, 3GPP TSG RAN WG1 #66bis, whole document.*

(Continued)

*Primary Examiner* — Hanh N Nguyen
*Assistant Examiner* — Jose L Perez
(74) *Attorney, Agent, or Firm* — Murphy, Bilak & Homiller, PLLC

(57) ABSTRACT

Some embodiments provide a method for transmitting a downlink control channel in at least one block of resources. The downlink control channel comprises a set of resource element groups. The method may be executed by a transmitting node, e.g., an eNB. The transmitting node first determines whether to transmit the downlink control channel using localized or distributed transmission. Responsive to determining to use localized transmission, the transmitting node performs the transmission such that all resource element groups in the set that are comprised in the same block of resources are mapped to the same antenna port, and the antenna port depends on which subset of resource element groups in the block of resources are used for the downlink control channel.

17 Claims, 34 Drawing Sheets

(56) References Cited

U.S. PATENT DOCUMENTS

| | | | |
|---|---|---|---|
| 2011/0170496 A1* | 7/2011 | Fong et al. | 370/329 |
| 2013/0039284 A1* | 2/2013 | Marinier | H04L 5/001 370/329 |
| 2013/0058285 A1* | 3/2013 | Koivisto | H04L 1/0046 370/329 |
| 2013/0100901 A1* | 4/2013 | Shan | H04L 5/0048 370/329 |

OTHER PUBLICATIONS

LG Electronics, Performance evaluation of multiplexing schemes for enhanced PDCCH transmission (R1-113195), Oct. 10-14, 2011, 3GPP TSG RAN WG1 Meeting #66bis, whole document.*

Samsung, Discussion on ePDCCH Design Issues (R1-112517), Aug. 22-26, 2011, 3GPP TSG-RAN1#66 meeting, whole document.*

Alcatel-Lucent, Alcatel-Lucent Shanghai Bell, Design details for enhanced PDCCH (R1-113322), Oct. 10-14, 2011, 3GPP TSG RAN WG1 Meeting #66bis, whole document.*

Ericsson, ST-Ericsson, NTT DOCOMO (R1-113558, Way Forward on downlink control channel enhancements by UE-specific RS AI 7.5.3.2), Oct. 10-14, 2011, 3GPP TSG-RAN WG1 #66bis, whole document.*

Samsung (R1-111446, Miscellaneous Corrections), May 9-13, 2011, 3GPP TSG-RAN WG1 #65, pp. 1-2, 22-23.*

Samsung (R1-112517, Discussion on ePDCCH Design Issues), Aug. 22-26, 2011, 3GPP TSG-RAN1#66 meeting, whole document.*

Research in Motion, UK Limited (R1-113238, E-PDCCH Transmission with Transmit Diversity), Oct. 10-14, 2011,3GPP TSG RAN WG1 Meeting #66bis, whole document.*

Alcatel-Lucent, Alcatel-Lucent Shanghai Bell (R1-112421, PDCCH Enhancement in Rel-11), Aug. 22-26, 2011,3GPP TSG RAN WG1 Meeting #66, whole document.*

Panasonic (R1-112351, Size adjustment of DCI format 0, 1A and 1), Aug. 22-26, 2011,3GPP TSG-RAN WG1 Meeting #66, whole document.*

Intel Corporation, (R1-112219, On Downlink Control Signalling Enhancement), Aug. 22-26, 2011,3GPP TSG RAN WG1 Meeting #66, whole document.*

Research in Motion, UK Limited (R1-113238, E-PDCCH Transmission with Transmit Diversity), Oct. 10-14, 2011, 3GPP TSG RAN WG1 Meeting #66bis, whole document.*

NEC Group (R1-103834, R-PDCCH blind decoding for Frequency Diversity and Frequency Selective R-PDCCH transmissions), Jun. 28-Jul. 2, 2010, 3GPP TSG-RAN WG1#61Bis, whole document.*

Ericsson, ST-Ericsson, NTT DOCOMO (R1-113558, Way Forward on downlink control channel enhancements by UE-specific RS AI 7.5.3.2), 3GPP TSG-RAN WG1 #66bis, Oct. 10-14, 2011, whole document.*

Pfaffenberger, Webster's New World Computer Dictionary, entry for "Central Processing Unit", Hungry Minds, Inc., Ninth Edition, 2001, p. 68.*

Wikipedia, (entry for Channel, web.archive.org/web/20111016164215/http://en.wikipedia.org/wiki/Channel_(communications)), Oct. 16, 2011, p. 1 paragraph 1.* dictionary.com (entry for localized, www.dictionary.com/browse/localized), p. 1.* dictionary.com (entry for distributed, www.dictionary.com/browse/distributed), p. 1.*

3rd Generation Partnership Project. "Reference signals for ePDCCH." 3GPP TSG-RAN WG1 #68bis, R1-121021, Mar. 26-30, 2012, pp. 1-6, Jeju, Republic of Korea.

3rd Generation Partnership Project. "Antenna ports for ePDCCH." 3GPP TSG-RAN WG1 #69, R1-121997, May 21-25, 2012, pp. 1-4, Prague, Czech Republic.

3rd Generation Partnership Project. "Performance Analysis of the Enhanced Downlink Control Signalling." 3GPP TSG RAN WG1 Meeting #66bis, R1-113202, Oct. 10-14, 2011, pp. 1-5, Zhuhai, China.

3rd Generation Partnership Project. "Performance evaluation of multiplexing schemes for enhanced PDCCH transmission." 3GPP TSG RAN WGl Meeting #66bis, R1-113195, Oct. 10-14, 2011, pp. 1-6, Zhuhai, China.

3rd Generation Partnership Project. "Search Space for Non-interleaved R-PDCCH." 3GPP TSG RAN WG1 Meeting #62bis, R1-105344, Oct. 11-15, 2010, pp. 1-6, Xi'an, China.

3rd Generation Partnership Project. "Consideration on E-PDCCH multiplexing and signaling." 3GPP TSG RAN WG1 #66bis, R1-113372, Oct. 10-14, 2011, pp. 1-3, Zhuhai, China.

3rd Generation Partnership Project. "E-PDCCH Transmission with Transmit Diversity." 3GPP TSG RAN WG1 Meeting #66bis, R1-113238, Oct. 10-14, 2011, pp. 1-4, Zhuhai, China.

3rd Generation Partnership Project. "DL Control Signaling Enhancements." 3GPP TSG RAN WG1 #66bis, R1-113100, Oct. 10-14, 2011, pp. 1-4, Zhuhai, China.

3rd Generation Partnership Project. "On enhanced PDCCH design." 3GPP TSG-RAN WG1 #66bis, R1-112928, Oct. 10-14, 2011, pp. 1-3, Zhuhai, China.

* cited by examiner

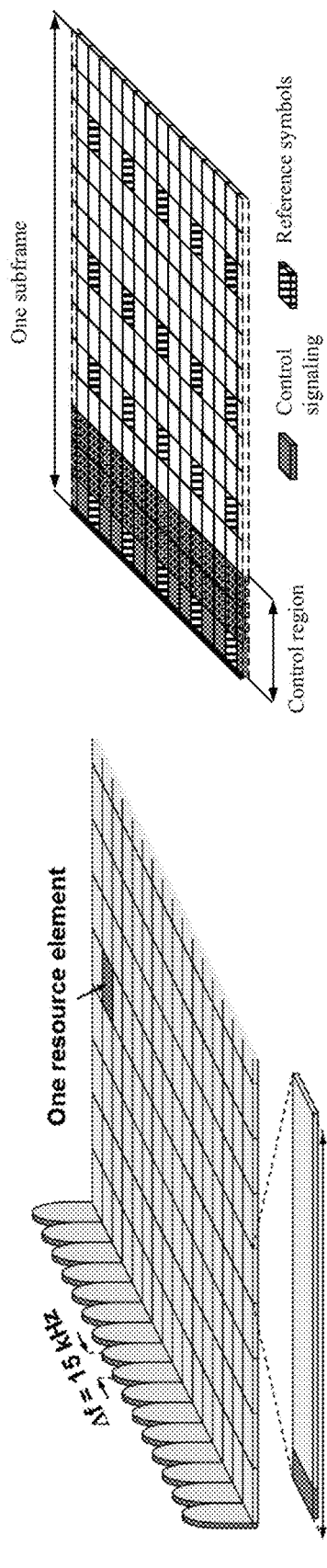
Figure 2 Downlink subframe
PRIOR ART
Figure 1 The LTE downlink physical resource
PRIOR ART

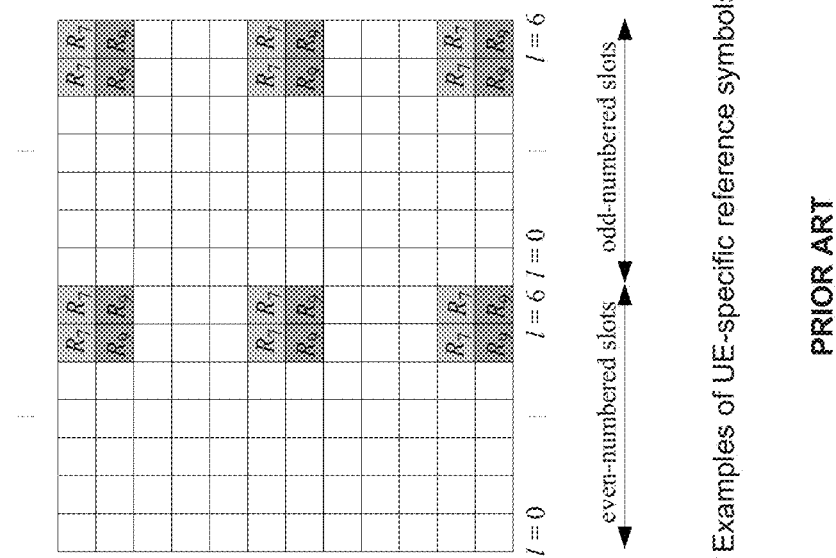
Figure 3 Examples of UE-specific reference symbols in LTE.
PRIOR ART

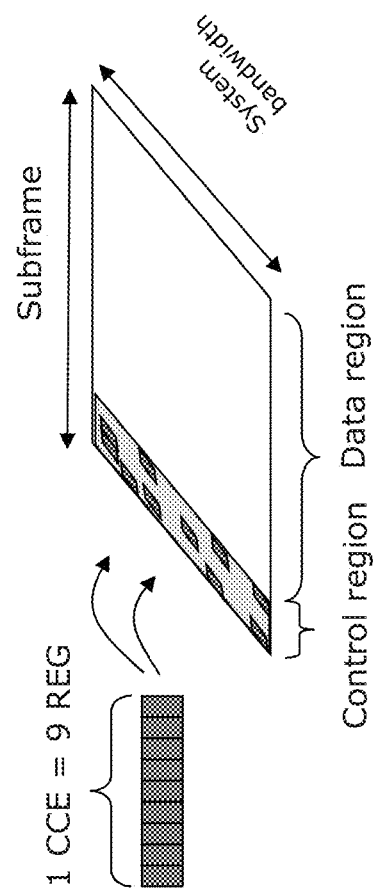
Figure 4 Mapping of one CCE belonging to a PDCCH to the control region which spans the whole system bandwidth.
PRIOR ART

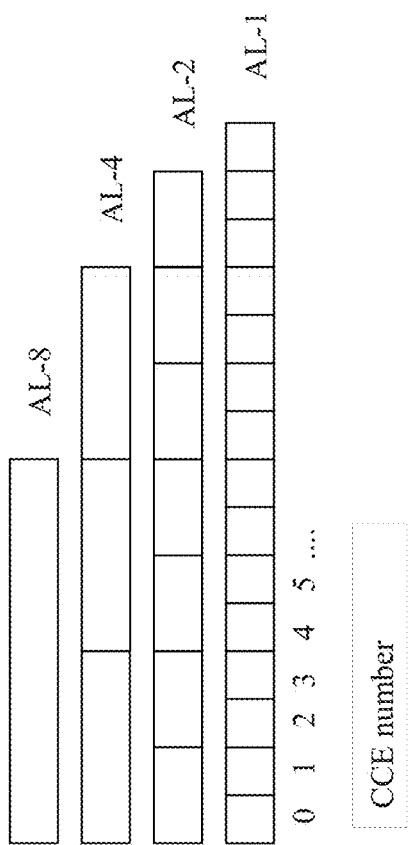
Figure 5 CCE aggregation illustrating aggregation levels (AL) 8,4,2 and 1.
PRIOR ART

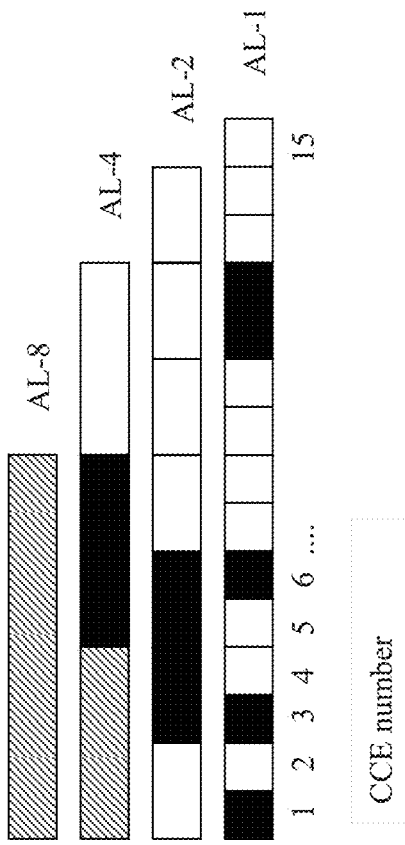
Figure 6 An exemplifying sketch showing the search space (black) a certain terminal needs to monitor. In total there are NCCE=15 CCEs in this example and the common search space is marked with slanted lines.
PRIOR ART

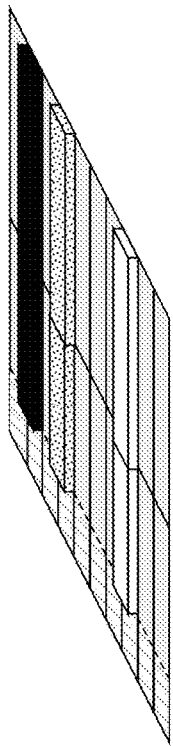

Figure 8 Downlink subframe showing 10 RB pairs and transmission of 3 R-PDCCH (white,dotted,black) of size 1 RB pair each. The R-PDCCH does not start at OFDM symbol zero to allow for a PDCCH to be transmitted in the first one to four symbols. The remaining RB pairs can be used for PDSCH transmissions.

PRIOR ART

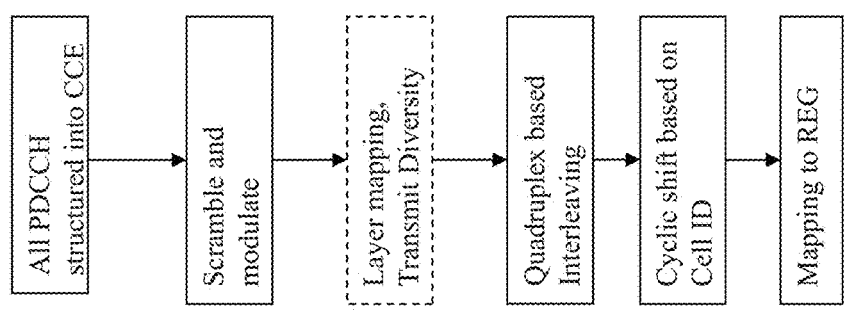

Figure 7 Processing steps of all the PDCCH to be transmitted in a subframe. PRIOR ART

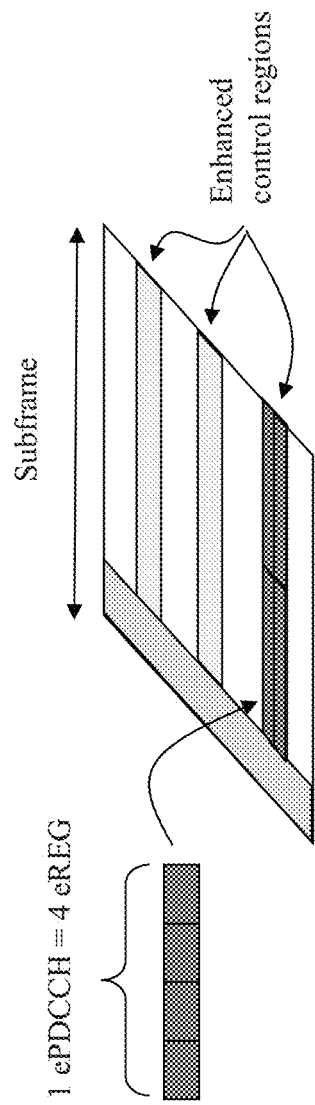
Figure 9 Downlink subframe showing a CCE belonging to an ePDCCH is mapped to one of the enhanced control regions, to achieve localized transmission.
PRIOR ART

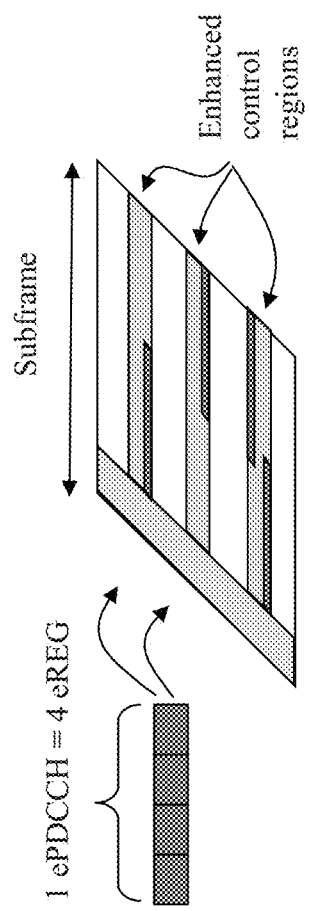
Figure 10 Downlink subframe showing a CCE belonging to an ePDCCH is mapped to multiple of the enhanced control regions, to achieve distributed transmission and frequency diversity or subband precoding.
PRIOR ART

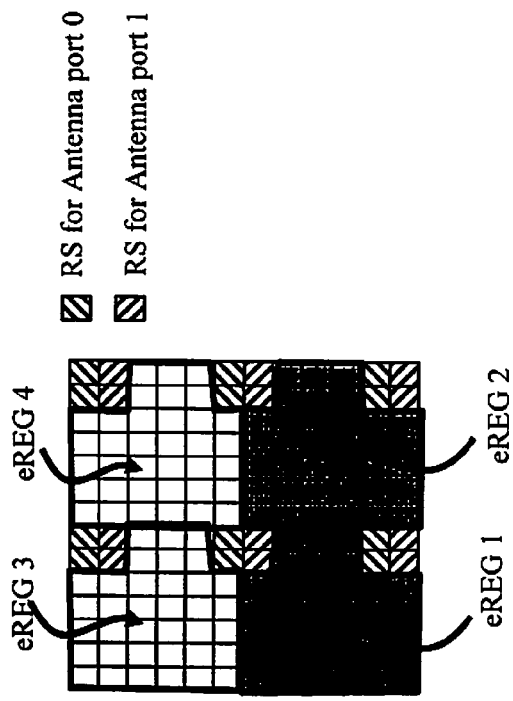
Figure 11 Downlink RB pair showing an example with 4 enhanced resource element groups (eREG) each consisting of 36 RE and 2 antenna ports (AP). Each eREG is associated with an antenna port and each AP is associated with 2 eREG.

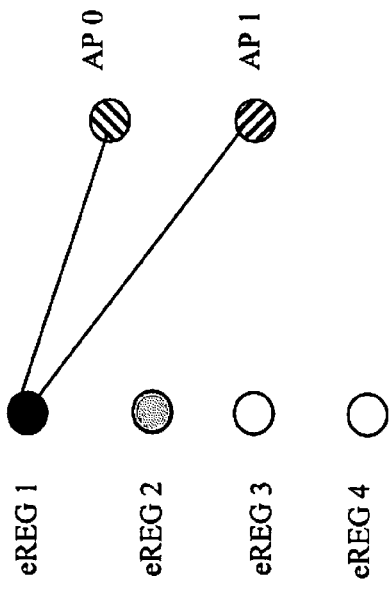
Figure 13 Association of AP to eREG in the case of spatial multiplexing where eREG 1 contains two layers, each associated with an AP.
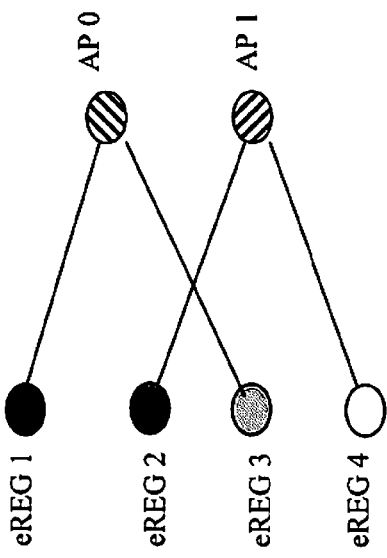
Figure 12 Association of AP to eREG in the example of Figure 10.

METHODS AND ARRANGEMENTS FOR TRANSMITTING AND RECEIVING CONTROL INFORMATION

TECHNICAL FIELD

The present invention relates generally to methods and arrangements for transmitting and receiving control information.

BACKGROUND

3GPP Long Term Evolution (LTE) technology is a mobile broadband wireless communication technology in which transmissions from base stations (referred to as eNBs) to mobile stations (referred to as user equipment (UE)) are sent using orthogonal frequency division multiplexing (OFDM). OFDM splits the signal into multiple parallel subcarriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE) see FIG. 1. Thus, an RB consists of 84 REs. An LTE radio subframe is composed of multiple resource blocks in frequency with the number of RBs determining the bandwidth of the system and two slots in time, see FIG. 2. Furthermore, the two RBs in a subframe that are adjacent in time are denoted as an RB pair.

In the time domain, LTE downlink transmissions are organized into radio frames of 10 ms, each radio frame consisting of ten equally-sized subframes of length $T_{subframe}=1$ ms.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference signals (RS) that are transmitted on the downlink. The RS consists of a collection of reference symbols and these reference symbols and their position in the time-frequency grid are known to the UE and hence can be used to determine channel estimates by measuring the effect of the radio channel on these symbols.

It should be noted in this context that the channel a UE measures is not necessarily from a particular physical transmit antenna element at the eNB to the UEs receiver antenna element, since the UE bases the measurement on a transmitted RS and the channel it measures depends on how the particular RS is transmitted from the multiple physical antenna elements at the eNB. Therefore, the concept of an antenna port is introduced, where an antenna port is a virtual antenna that is associated with an RS.

In 3GPP TS 36.211, an antenna port is defined such that the channel over which a symbol on the antenna port is conveyed can be inferred from the channel over which another symbol on the same antenna port is conveyed. This definition also applies to the present disclosure.

A UE measures the channel from an antenna port to the receiver antenna element using the RS associated with that antenna port. Which physical transmit antenna element, or group of elements that are actually used for the transmission of this RS is transparent and also irrelevant for the UE; the transmission on an antenna port may use a single physical antenna element or a combination of signals from multiple antenna elements. Hence, the precoding or mapping to physical antenna elements that was applied by the eNB is transparently included in the effective channel that the UE measures from the antenna port.

An example of utilization of multiple antenna elements is the use of transmit precoding to direct the transmitted energy towards one particular receiving UE, by using all available antenna elements for transmission to transmit the same message, but where individual phase and possibly amplitude weights are applied at each transmit antenna element. This is sometimes denoted UE-specific precoding and the RS in this case is denoted UE-specific RS. If the UE-specific RS in the RB is precoded with the same UE-specific precoding as the data, then the transmission is performed using a single virtual antenna, i.e. a single antenna port, and the UE need only to perform channel estimation using this single UE-specific RS and use it as a reference for demodulating the data in this RB. In other words, the UE does not need to know the precoding vector that was applied by the eNB when transmitting the data. Selecting and adapting the precoding vector is typically left to the implementation, and is thus not described in standard specifications.

The UE-specific RS are transmitted only when data is transmitted to a UE in the subframe, otherwise they are not present. In LTE, UE-specific RS are included as part of the RBs that are allocated to a UE for reception of user data. Examples of UE-specific reference signals in LTE can be found in FIG. 3 where for example all RE denoted $R_7$ contains modulated reference symbols belonging to one "RS". Hence, what is known as an RS is a collection reference symbols transmitted in a set of distributed REs.

Another type of reference signals are those that can be used by all UEs and thus have wide cell area coverage. One example of these is the common reference signals (CRS) that are used by UEs for various purposes including channel estimation and mobility measurements. These CRS are defined so that they occupy certain pre-defined REs within all the subframes in the system bandwidth irrespectively of whether there is any data being sent to users in a subframe or not. These CRS are shown as "reference symbols" in FIG. 2.

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on. Examples of control messages are the physical downlink control channel (PDCCH) which for example carry scheduling information and power control messages, the physical HARQ indicator channel (PHICH), which carries ACK/NACK in response to a previous uplink transmission and the physical broadcast channel (PBCH) which carries system information.

In LTE Rel-10, control messages are demodulated using the CRS (except for the R-PDCCH, see below), hence they have a wide cell coverage to reach all UEs in the cell without having knowledge about their position. The first one to four OFDM symbols, depending on the configuration, in a subframe are reserved for control information, see FIG. 2. Control messages could be categorized into those types of messages that need to be sent only to one UE (UE-specific control) and those that need to be sent to all UEs or some subset of UEs numbering more than one (common control) within the cell being covered by the eNB It shall be noted in this context that in future LTE releases, there will be new carrier types which may not have a PDCCH transmission or transmission of CRS.

Control messages of PDCCH type are transmitted in multiples of units called control channel elements (CCEs) where the modulated symbols of each CCE maps to 36 REs. A PDCCH may have an aggregation level (AL) of 1, 2, 4 or 8 CCEs to allow for link adaptation of the control message. Thus, the term "aggregation level" is used in this disclosure to refer to the number of CCEs that form a PDCCH. Furthermore, the 36 modulated symbols of each CCE is mapped to 9 resource element groups (REG) consisting of 4 RE each. These REG are distributed over the whole bandwidth to provide frequency diversity for a CCE, see FIG. 4. Hence, a PDCCH, which consists of up to 8 CCEs, spans the entire system bandwidth in the first n={1, 2, 3 or 4} OFDM symbols, depending on the configuration value of n.

After channel coding, scrambling, modulation and interleaving of the control information, the modulated symbols are mapped to the resource elements in the control region. In total there are $N_{CCE}$ CCEs available for all the PDCCH to be transmitted in the subframe and the number $N_{CCE}$ varies from subframe to subframe depending on the number of control symbols n, the number of antenna ports associated with CRS and the configured number of HARQ indicator channels (PHICH).

As the number of control symbols n is indicated by the control format indicator channel (PCFICH) in every subframe, the value of $N_{CCE}$ varies from subframe to subframe, the terminal needs to blindly determine the position and the number of CCEs used for its PDCCH. Also, a UE need to blindly search and detect if the control channel is valid for it, without knowing the CCE aggregation level beforehand, which can be a computationally intensive decoding task due to the large value of $N_{CCE}$. Therefore, some restrictions have been introduced in the number of possible blind decodings a terminal needs to go through. For instance, the CCEs are numbered and CCE aggregation levels of size K can only start on CCE numbers evenly divisible by K, see FIG. 5.

The set of CCEs where a terminal needs to blindly decode and search for a valid PDCCH is called a search space. This is the set of CCEs on a AL a terminal should monitor for scheduling assignments or other control information, see example in FIG. 6. In each subframe and on each AL, a terminal will attempt to decode all the PDCCHs that can be formed from the CCEs in its search space. If the CRC checks, then the content of the PDCCH is assumed to be valid for the terminal and it further processes the received information. Often, two or more terminals will have overlapping search spaces and the network has to select one of them for scheduling and transmission of the control channel. When this happens, the non-scheduled terminals are said to be blocked. The search spaces vary pseudo-randomly from subframe to subframe to minimize the probability of blocking.

A search space is further divided to a common and a terminal (UE)-specific part. In the common search space, the PDCCH containing information to all or a group of terminals is transmitted (paging, system information etc). If carrier aggregation is used, a terminal will find the common search space present on the primary component carrier (PCC) only. The common search space is restricted to aggregation levels 4 and 8 to give sufficient channel code protection for all terminals in the cell. Since it is a broadcast channel, link adaptation can not be used. The $m_8$ and $m_4$ first PDCCH (with lowest CCE number) in an AL of 8 or 4 respectively belong to the common search space. For efficient use of the CCEs in the system, the remaining search space is terminal specific at each aggregation level.

A CCE consists of 36 QPSK modulated symbols that map to the 36 RE unique for this CCE. To maximize the diversity and interference randomization, interleaving of all the CCEs is used before a cell specific cyclic shift and mapping to REs, see the processing steps in FIG. 7. Note that in most cases some CCEs are empty during transmission due to the PDCCH location restriction to terminal search spaces and aggregation levels. The empty CCEs are included in same the interleaving process and mapping to RE as any other PDCCH to maintain the search space structure. Empty CCE are set to zero power and this power can instead be used by non-empty CCEs to further enhance the link performance of the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex (group of 4) based and the mapping process has a granularity of 1 REG and one CCE corresponds to 9 REGs (=36 RE).

Transmission of the physical downlink shared data channel (PDSCH) to UEs, is using the RE in a RB pair that are not used for control messages or RS. The PDSCH can either be transmitted using the UE-specific reference symbols or the CRS as a demodulation reference, depending on the configured transmission mode. The use of UE-specific RS allows a multi-antenna eNB to optimize the transmission using pre-coding of both data and reference signals being transmitted from the multiple antennas so that the received signal energy increases at the UE. Consequently, the channel estimation performance is improved and the data rate of the transmission may be increased.

In Rel-10 of LTE a relay control channel was also defined, denoted R-PDCCH, for transmitting control information from eNB to relay nodes. The R-PDCCH is placed in the data region, hence, similar to a PDSCH transmission. The transmission of the R-PDCCH can either be configured to use CRS to provide wide cell coverage, or relay node (RN) specific reference signals to improve the link performance towards a particular RN by precoding, similar to the enhancement of the PDSCH transmission with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs, see FIG. 8.

In LTE Rel.11 discussions, attention has turned to adopting the same principle of UE-specific transmission as for the PDSCH and the R-PDCCH also for control channels (including PDCCH, PHICH, PCFICH, and PBCH) by allowing the transmission of generic control messages to a UE using such transmissions to be based on UE-specific reference signals. This means that precoding gains can be achieved also for the control channels, thereby achieving an extended or enhanced control channel. Another benefit is that different RB pairs configured for the extended control channel can be configured in different cells or different transmission points within a cell. Thereby, intercell interference coordination between extended control channels may be achieved. This frequency coordination is not possible with the PDCCH since the PDCCH spans the whole bandwidth. FIG. 9 shows an extended or enhanced PDCCH (ePDCCH) which, similarly to the CCE in the PDCCH, is divided into multiple groups and mapped to one of the RB pairs configured for enhanced control channels, here denoted enhanced control regions.

Note that in FIG. 9, the enhanced control region does not start at OFDM symbol zero, to accommodate simultaneous transmission of a PDCCH in the subframe. However, as mentioned above, there may be carrier types in future LTE releases that do not have a PDCCH, in which case the enhanced control region could start from OFDM symbol zero within the subframe.

Even if the enhanced control channel enables UE-specific precoding and also possibly localized transmission (within one RB pair) as illustrated in FIG. 9, it may in some cases be useful to be able to transmit an enhanced control channel in a broadcasted, wide-area coverage fashion. This is useful if the eNB does not have reliable information to perform precoding towards a certain UE. In this case a wide-area coverage transmission is more robust, although the precoding gain is lost. Another case when broadcast and wide-area transmission is useful is when the particular control message is intended for more than one UE. In this case, UE-specific precoding cannot be used. An example of this is the transmission of common control information using ePDCCH (i.e. in the common search space). Yet another case where wideband transmission is useful is when subband precoding is utilized. Since the UE estimates the channel in each RB pair individually, the eNB can choose different precoding vectors in the different RB pairs, if the eNB has such information that the preferred precoding vectors are different in different parts of the frequency band. In any of these cases, a distributed transmission may be used, see FIG. 10, where the eREG belonging to the same ePDCCH are distributed over the enhanced control regions.

Thus, there is a need for mechanisms for providing both localized and distributed transmission of downlink control information in an efficient and flexible way.

SUMMARY

Some embodiments provide a method for transmitting a downlink control channel in at least one block of resources. The downlink control channel comprises a set of resource element groups. The method may be executed by a transmitting node, e.g., an eNB. The transmitting node first determines whether to transmit the downlink control channel using localized or distributed transmission. Responsive to determining to use localized transmission, the transmitting node performs the transmission such that all resource element groups in the set that are comprised in the same block of resources are mapped to the same antenna port, and the antenna port depends on which subset of resource element groups in the block of resources are used for the downlink control channel.

Some embodiments provide a transmitting node for transmitting a downlink control channel in at least one resource block, wherein the downlink control channel comprises a set of resource element groups. The transmitting node comprises radio circuitry and processing circuitry. The processing circuitry is configured to determine whether to transmit the downlink control channel using localized or distributed transmission. The processing circuitry is further configured to, responsive to determining to use localized transmission, perform the transmission via the radio circuitry such that all resource element groups in the set that are comprised in the same resource block or resource block pair are mapped to the same antenna port, and the antenna port depends on which resource element groups are comprised in the resource block or resource block pair.

Some embodiments provide a method in a user equipment for receiving a downlink control channel in at least one resource block, wherein the downlink control channel comprises a set of resource element groups. The user equipment selects a candidate set of resource element groups, corresponding to a candidate downlink control channel, from a search space configured for the user equipment. Then, for each resource element group in the candidate set, the user equipment identifies an antenna port that the resource element group is mapped to based on the resource element group. The user equipment then attempts to decode the downlink control channel based on the estimated channel from the identified antenna port for each resource element group.

Some embodiments provide a receiving node for receiving a downlink control channel in at least one resource block, wherein the downlink control channel comprises a set of resource element groups. The transmitting node comprises radio circuitry and processing circuitry. The processing circuitry is configured to select a candidate set of resource element groups, corresponding to a candidate downlink control channel, from a search space configured for the user equipment. The processing circuitry is further configured to, for each resource element group in the candidate set, identify an antenna port the resource element group is mapped to, based on the resource element group. The processing circuitry is further configured to attempt to decode the downlink control channel based on the estimated channel from the identified antenna port for each resource element group.

Some embodiments provide a method for configuring downlink control channel transmission for a user equipment. The method may be executed in a transmitting node, e.g., an eNB. According to the method, the transmitting node sends a message to the user equipment indicating a set of blocks of resources, or resource element groups that are reserved for localized transmission of a downlink control channel.

Some embodiments provide a method for configuring downlink control channel transmission for a user equipment. The method may be executed in a transmitting node, e.g. an eNB. According to the method, the transmitting node sends a message to the user equipment indicating a set of blocks of resources, or resource element groups, that are reserved for distributed transmission of a downlink control channel.

Some embodiments provide a method for configuring downlink control channel transmission for a user equipment. The method may be executed in a transmitting node, e.g. an eNB. According to the method, the transmitting node sends a message to the user equipment indicating a set of blocks of resources, or resource element groups, that are reserved for localized transmission of a downlink control channel, and indicating a second set of blocks of resources, or resource element groups, that are reserved for distributed transmission of a downlink control channel.

Some embodiments provide a method for receiving configuration information about downlink control channel transmission. The method may be executed in a receiving node, e.g., a user equipment. According to the method, the user equipment receives a message indicating a set of blocks of resources, or resource element groups, that are reserved for localized transmission of a downlink control channel.

Some embodiments provide a method for receiving configuring information about downlink control channel transmission. The method may be executed in a receiving node, e.g. a user equipment. According to the method, the user equipment receives a message indicating a set of blocks of resources, or resource element groups, that are reserved for distributed transmission of a downlink control channel.

Some embodiments provide a method for receiving configuration information about downlink control channel transmission. The method may be executed in a receiving node, e.g., a user equipment. According to the method, the user equipment receives a message indicating a set of blocks of resources, or resource element groups, that are reserved for localized transmission of a downlink control channel, and indicating a second set of blocks of resources, or resource element groups, that are reserved for distributed transmission of a downlink control channel.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

BRIEF DESCRIPTION OF THE DRAWINGS

FIG. 1 is a schematic diagram showing the LTE downlink physical resource

FIG. 2 is a schematic diagram showing a downlink subframe

FIG. 3 is a schematic diagram showing UE-specific reference symbols

FIG. 4 is a schematic diagram showing mapping of one CCE

FIG. 5 is a schematic diagram showing CCE aggregation

FIG. 6 is a schematic diagram showing a search space

FIG. 7 is a flow chart illustrating processing steps for transmitting a PDCCH

FIG. 8 is a schematic diagram illustrating an R-PDCCH

FIG. 9 is a schematic diagram showing an example of localized transmission

FIG. 10 is a schematic diagram showing an example of distributed transmission

FIG. 11 is a schematic diagram showing a PRB pair with eREGs

FIG. 12 and FIG. 13 are schematic diagrams showing example eREG-to-AP associations FIG. 20 is intentionally omitted.

DETAILED DESCRIPTION

Figure 15:
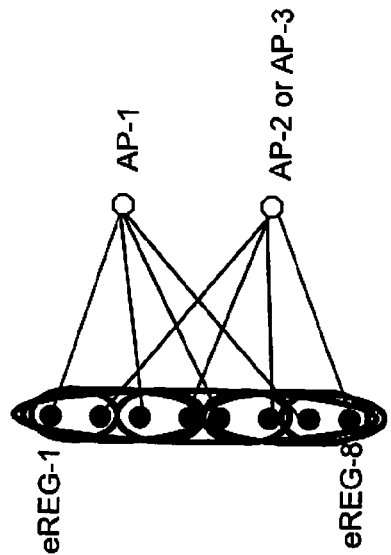
FIG. 15 is a schematic diagram showing an example D-type block of resources

It should be noted that although terminology from 3GPP LTE has been used in this disclosure to exemplify the invention, this should not be seen as limiting the scope of the invention to only the aforementioned system. Other wireless systems employing multi-antenna transmission may also benefit from exploiting the ideas covered within this disclosure.

Specific examples in this disclosure refer to ePDCCH, enhanced PDCCH, extended PDCCH, extended control channel, enhanced control channel, extended downlink control channel or enhanced downlink control channel. The enhanced or extended control channel discussed in this disclosure also encompasses transmission of HARQ-ACK for uplink transmission, thus an extended or enhanced PHICH (ePHICH). It should therefore be noted that these terms are intended to encompass any control channel, in particular a downlink control channel, which is frequency multiplexed with data, and which has self-contained reference signals for demodulation (DMRS) within the block of resources occupied by the associated control information. Such a control channel may also be referred to as an extended control channel. Thus, when examples herein refer specifically to an ePDCCH, or enhanced PDCCH, this should not be construed as limiting. The concepts presented in this disclosure apply generally to enhanced or extended control channels.

The expression "block of resources" as used in this disclosure refers to a block or group of resources, consecutive in frequency and time, configured for enhanced control channel transmission. The smallest resource entity is a resource element (RE). In two example and non-limiting implementations, a "block of resources" may be a physical resource block (PRB) or a physical resource block pair (PRB pair). In LTE, a PRB pair corresponds to a subframe where the first PRB in the pair occupies the first slot, and the second PRB in the pair occupies the second slot. However, it should be noted that whenever this disclosure refers to using a "PRB pair" this should not be construed as limiting. It is equally possible to transmit the control information in a single PRB (e.g. in only the first slot, or only the second slot), in a part of a single PRB or in a part of a PRB pair. It is also conceivable to use a larger group of resources, e.g., two or four PRB pairs.

When this disclosure refers to a resource element group being "mapped" to an antenna port, this means that the UE can use the channel estimated by the DMRS associated with the antenna port when demodulating a message in the resource element group which is said to be mapped to the antenna port.

In a possible concept for enhanced control signal transmission with UE-specific reference signals, multiple orthogonal resources are defined in each configured RB or RB pair used for control channel transmission. A resource is most generally defined as a region in the time-frequency OFDM grid consisting of a subset of the RE in the RB or in the RB pair plus a cover code from a set of orthogonal cover codes. Hence, the resources are orthogonally multiplexed in time, frequency and code domain (TDM, FDM and CDM respectively). For the following description, without loss of generality, it is assumed that the code division is not used. Instead, a resource is defined as a region in the time frequency grid only.

Each of the time frequency resources is associated with a unique RS, or equivalently antenna port, which is located in the same RB or RB pair. When a UE demodulates the information in a given resource of the RB or RB pair, it uses the RS/antenna port associated with that resource. The demodulation RS corresponding to a certain antenna port will also be denoted DMRS below. Furthermore, each resource in an RB or RB pair can be independently assigned to UEs. See FIG. 11 for an example where time and frequency division of RE into resources, denoted enhanced resource element groups or RE groups, are used (the eREG is thus one resource). Each eREG is associated with one RS from the set of orthogonal RS in the RB or RB pair.

Each eREG is associated with an antenna port (AP) and this can for example be described with a node diagram as shown in FIG. 12. Here it can be seen that eREG 1 and eREG 3 are associated with antenna port (AP) 0. When a UE demodulates part of an ePDCCH transmitted in for example eREG1 it will use the RS associated with AP 0 for demodulation. It should be noted that in some embodiments, an eREG may be associated with more than one antenna port, as will be explained below. The number of antenna ports may be fewer than, the same as, or larger than the number of physical transmit antennas.

The terms eREG, enhanced resource element group, or simply resource element group (REG), are interchangeably used in this disclosure to refer to a group of resource elements in the time-frequency grid which may be used for transmitting downlink control information, i.e., REs that are not used for other purposes such as PHICH, PCFICH, demodulation reference signals, CRS, CSI-RS, etc. The resource elements in a resource element group are comprised in the same block of resources, e.g., the same PRB or PRB pair, and each resource element group is associated with at least one antenna port. In various examples in this disclosure, a PRB pair is assumed to contain 8 eREGs, but this should not be construed as limiting. A block of resources may contain a 30 fewer or larger number of eREGs, e.g., 4, 6 or 12 eREGs.

Each enhanced downlink control channel comprises at least one control channel element (CCE), where the CCEs may be either contained in a single block of resources or distributed over several blocks (i.e. distributed in frequency). Each CCE in turn comprises a fixed number of eREGs. In this disclosure, two eREGs per CCE is assumed, but other configurations are equally possible.

Note that even if multiple orthogonal RS are used in the block of resources, e.g. the RB or RB pair, there is only one layer of control data transmitted. As can be seen in FIG. 12, it is possible that more than one eREG is using one AP, which is possible since the eREG are orthogonal in the time-frequency OFDM grid. Note that in this case, both eREG1 and eREG3 will use the same precoding vector since they use the same antenna port.

Figure 14:
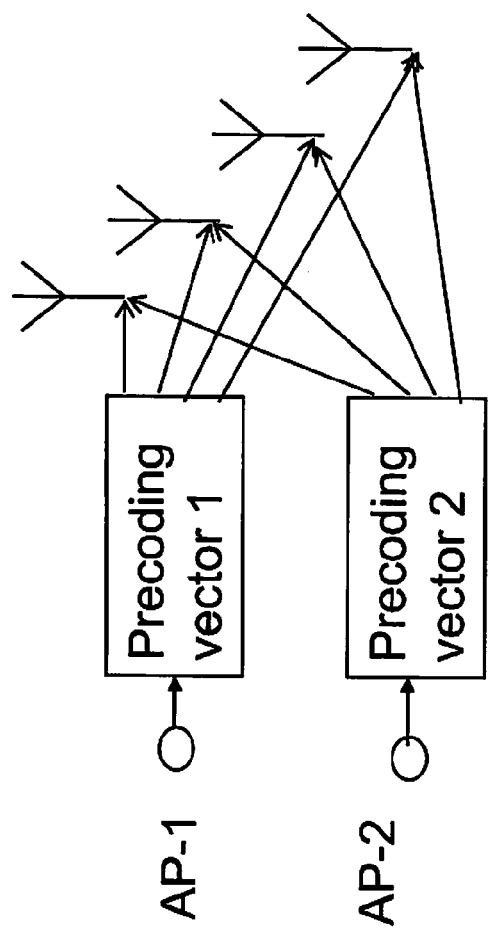
FIG. 14 is a schematic diagram showing MIMO multi-layer transmission

The use of antenna ports here shall not be confused with MIMO multiple layer transmission in an RB pair, where each of the multiple RS or AP corresponds to a transmitted MIMO layer. If this would be the case, one eREG would have multiple layers and each eREG would then need to be associated with more than one AP, one per layer. The related node diagram for this case is shown in FIG. 13. FIG. 14 shows an example of MIMO multi-layer transmission using two antenna ports, denoted AP-1 and AP-2. Note that in MIMO, the maximum number of antenna ports is commonly the same as the number of physical antennas.

In each resource, control information is transmitted comprising an enhanced PDCCH, a CCE or a fraction of a CCE, an enhanced PHICH or an enhanced PBCH. If the resource is too small to fit a whole enhanced PDCCH, CCE, PHICH or PBCH, a fraction may be transmitted in the resource and the other fraction in other resources in other RB or RB pairs elsewhere in the same subframe, as was shown in FIG. 10. Note that resources in other RB or RB pairs are associated with their respective antenna ports within the same RB or RB pair.

The transmission of an enhanced control channel should be performed in an efficient and flexible way. In particular, it would be advantageous to minimize or at least reduce the RS overhead and to use only the necessary number of antenna ports within a block of resources, as each additional antenna port implies that another channel estimation needs to be performed at the user equipment. Furthermore it would be desirable to support both localized and distributed transmission of enhanced control channels within the same time frame, e.g. within the same subframe or slot. This would make it possible to take advantage of beamforming gains when sufficient precoding information is available, while also being able to transmit broadcast control information to several user equipments or in case the channel to the user equipment is not known.

Whenever a transmitted ePDCCH using UE-specific precoding is using more than one eREG within a PRB pair, then the need to estimate multiple channels in the UE should be avoided. In this case, an eREG to AP association rule selects only one AP per group of used eREG according to some embodiments. See an example in Figure, showing a case where all four eREG are used and AP 7 is used for the demodulation of the ePDCCH transmitted using all eREG. Another advantage of such AP association is that the DMRS power can sometimes be transferred from unused AP to used AP, which improves the channel estimation performance.

Figure 38:
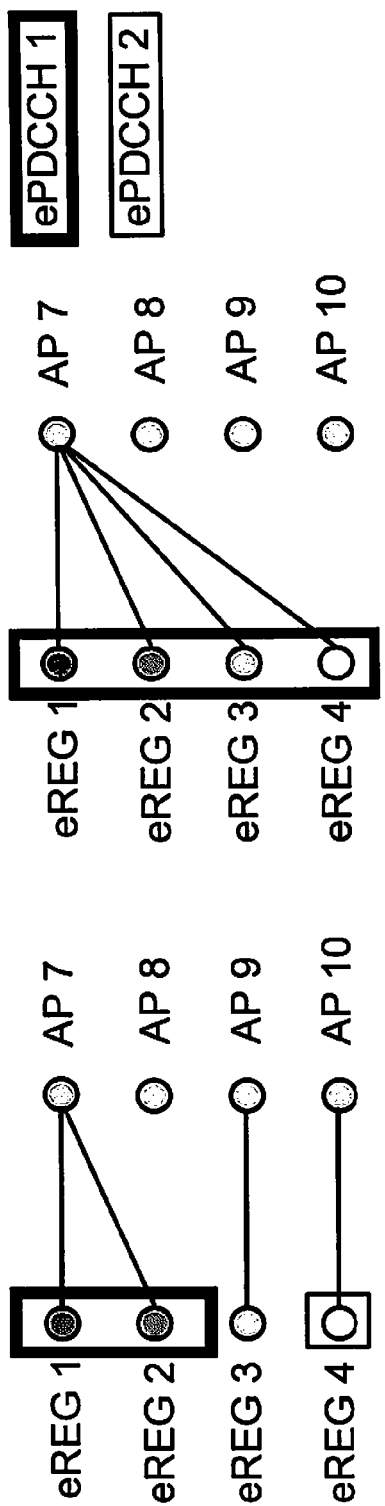
FIG. 38 and FIG. 39 show example antenna port mappings

FIG. 38 shows an example of antenna port association for UE-specific precoding when an ePDCCH is using two or four eREGs within the PRB pair respectively. In the left example, AP 9 is unused. In the right example, an ePDCCH is using the whole PRB pair and only AP 7 is used, the other APs are unused. In the left example, eREG1 and eREG2 are used to transmit ePDCCH 1, and eREG 4 is used to transmit ePDCCH 2. In the right example, eREGs1-4 are used to transmit ePDCCH 1.

Note that the channel estimation will in this case be part of the blind decoding since which antenna port is used depends on the hypothesis on the CCE aggregation level and consequently also the number of used eREGs.

When UE-specific precoding is not used, such as when the transmitted control channel contains broadcast information or when the preferred precoding vector is unknown at the eNB, then the DMRS can be used as a "localized common reference signal", used by multiple UEs for demodulating the ePDCCH. Equivalently, it can be said that the AP is shared for multiple ePDCCH messages and/or for multiple UEs. In this case it is sufficient to use one or two (for antenna diversity) antenna ports per PRB pair for all eREGs, and an example of this association is given in Figure where two ports, AP 7 and AP 9 are used to provide antenna diversity. As AP 8 and 10 are never used, AP 7 and 9 can always be power boosted by 3 dB.

Figure 39:
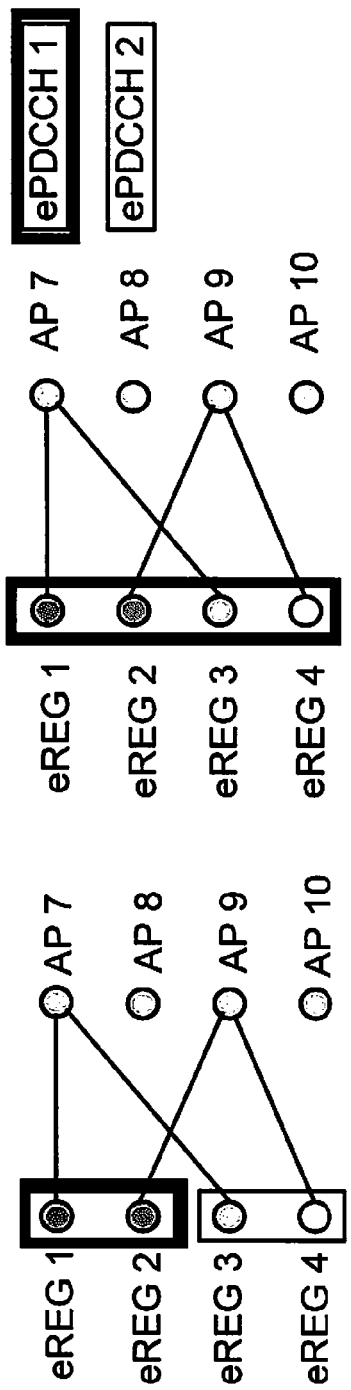

FIG. 39 shows an association between eREG and AP in the case of shared antenna ports. This can be used for distributed transmission of the ePDCCH. In this case is the eREG to AP association fixed and not dependent on the number of eREG an ePDCCH is using. In the left example, ePDCCH 1 is transmitted in eREG 1 and eREG2, and ePDCCH 2 is transmitted in eREG 3 and eREG 4. In the right-hand example, ePDCCH 1 is transmitted in eREG1-eREG4.

Furthermore, since these AP are shared by multiple UEs or multiple ePDCCH messages, and antenna diversity is likely to be utilized, the used eREG to AP associations should be fixed and not depend on how many eREG are used. This also implies that the DMRS power is always known and the channel estimation is separated from the blind decoding, which may simplify the receiver.

Thus, according to some embodiments, each eREG is associated with an antenna port. When UE-specific precoding is used, e.g. for localized transmission, one antenna port per PRB pair is used for a given ePDCCH transmission. Which AP to use depends on which eREGs are used for the transmission. When UE-specific precoding is not used and AP are shared (e.g. for some cases of distributed transmission), the eREG to AP associations are fixed. In these embodiments, the mapping from eREGs to antenna ports is dependent on whether user-specific precoding is used or not.

In the present context, distributed transmission refers to distribution of the ePDCCH in the frequency domain in order to obtain frequency diversity. Thus, in a typical case the ePDCCH is spread across several different PRBs or PRB pairs, covering a large part of the spectrum or even the whole spectrum. Each PRB or PRB pair will thus typically contain parts of ePDCCHs for multiple UEs. Distributed transmission will also be referred to as "D" transmission below. Distributed transmission is often used when user-specific precoding is not applied. Thus, the control channel is broadcast over a wide area or, stated differently, a wide beam is formed. Alternatively, the message may be transmitted in different parts and each part has a pseudo-randomly selected precoder. It is pointed out, however, that distributed transmission may also be used when user-specific precoding is applied. This transmission mode may e.g. be beneficial when the eNB only has access to wideband precoding information, as it is then possible to capture some beamforming gain and some diversity gain.

Localized transmission, on the other hand, refers to a transmission that is localized in frequency. The ePDCCH may, in this case, be confined within a single PRB or PRB pair, but it may also occupy two or more PRB or PRB pairs which will then typically be adjacent in frequency. For instance, the largest aggregation level as currently defined (8 CCE) requires 8*36=288 RE, which requires two PRB pairs if QPSK modulation is used. Localized transmission will also be referred to as "L" transmission below. Localized transmission is often used when UE-specific precoding is applied. A beam may then be formed which is directed to a specific user equipment. A prerequisite is that the transmitter has knowledge of the downlink channel to the user equipment.

Further embodiments are described below. In some of these embodiments, it will be assumed that user-specific precoding is always applied together with localized transmission of an ePDCCH, and that non-user-specific precoding is always applied together with distributed transmission of an ePDCCH. As will be explained in the following paragraphs, this is a common case in practice. However, this should not be construed as limiting and it should be realized in particular that user-specific precoding can be applied independent on whether the transmission is localized or distributed. That being said, it is noted that in the embodiments where user-specific precoding implies localized transmission, and non-user-specific precoding implies distributed transmission, the eREG to AP mapping may be determined, as in the above embodiments, based on whether the transmission is perfomed with user-specific precoding or not—or equivalently, the eREG-to-AP mapping may be determined based on whether the transmission is distributed or localized.

In some embodiments, the association between resource element groups and antenna ports is then determined based on certain logic or rules. For example, when user-specific precoding is applied for a control channel in a block of resources, the antenna port may be determined based on the used resource element groups in that block of resources. More specifically, the antenna port may be determined based on the number of used resource element groups and/or the location of the used resource element groups within the block of resources. It should be noted that since user-specific precoding is applied, the same antenna port will be used for all resource element groups within the same block of resources. Therefore, the number of antenna ports used in a block of resources is flexible and depends on the used resource element groups. By adapting the number of antenna ports to the used resource element groups in this manner, a reduction of antenna port overhead, increased energy efficiency, and improved channel estimation may be achieved, as will be further explained below.

For transmission of a control channel without user-specific precoding, a fixed number of antenna ports (e.g. two antenna ports) may be used in each block of resources, and the antenna port for each resource element group is determined according to a predefined mapping, i.e. each resource element group is associated with a predetermined antenna port. Furthermore, resource element groups within the same block of resources that are used for the same control channel may use different antenna ports to achieve antenna diversity.

In a particular embodiment, the blocks of resources (e.g. PRBs or PRB pairs) configured for control channel transmission are categorized into "L"-type and "D"-type, where L-type blocks are used for localized transmission, and D-type blocks are used for distributed transmission. In this particular embodiment, and in the ones shown in FIGS. 19-25, 29, 31, 33, 34, it is assumed that user-specific precoding is applied for localized transmissions, but not for distributed transmissions. As pointed out above, this is not necessarily the case. The categorization may be communicated from the transmitting node to the user equipment in a configuration message. A UE search space may span both L and D-category blocks of resources, to enable the eNB to flexibly transmit a control channel to the UE using either L or D transmission. Different control channels for the same UE may be transmitted using a mix of L and D transmission.

It is further pointed out that in other embodiments, the blocks of resources configured for control channel transmission are categorized such that some blocks are reserved for transmission with user-specific precoding, and other blocks are reserved for transmission without user-specific precoding. The mapping from eREG to AP may then be determined based on the type of the block.

In the examples set forth below, it is generally assumed that a maximum of four antenna ports are available. Furthermore, it is assumed that the reference signals for antenna port 1 (AP-1) and antenna port 2 (AP-2) are code division multiplexed in the resource elements denoted R7 in FIG. 3, and that the reference signals antenna port 3 (AP-3) and antenna port 4 (AP-4) are code division multiplexed in the resource elements denoted R9 in FIG. 3. However, it should be understood that the concepts described here apply generally to any number of antenna ports, which may be code multiplexed in a different manner or not code multiplexed at all.

FIG. 15 shows an example D-type block of resources. The block of resources may be an RB or RB pair and comprises 8 resource element groups, eREG-1 to eREG-8, illustrated by the black circles. As indicated by the ovals encircling the eREGs, two, four, or eight resource element groups may be grouped together forming a control channel or a part of a control channel. Each eREG is associated with an antenna port according to a predetermined mapping. In this example, eREG-1, 3, 5, and 7 are associated with AP-1, and eREG-2, 4, 6, and 8 are associated with either AP-2 or AP-3. Thus, a total of two antenna ports are used in this block of resources, either AP-1 and AP-2, or AP-1 and AP-3. Since the eREGs are orthogonal in the time-frequency domain and the precoding is not user-specific, the same DMRS may be used for multiple user equipments, which reduces the RS overhead and increases energy efficiency. The number of antenna ports used in a D-type block is fixed in this example, but may also be configurable by higher layers, e.g. using RRC signaling. The antenna ports to use (e.g. AP-1 and AP-2 or AP-1 and AP-3) may also be fixed or configurable by higher layers.

Figure 16:
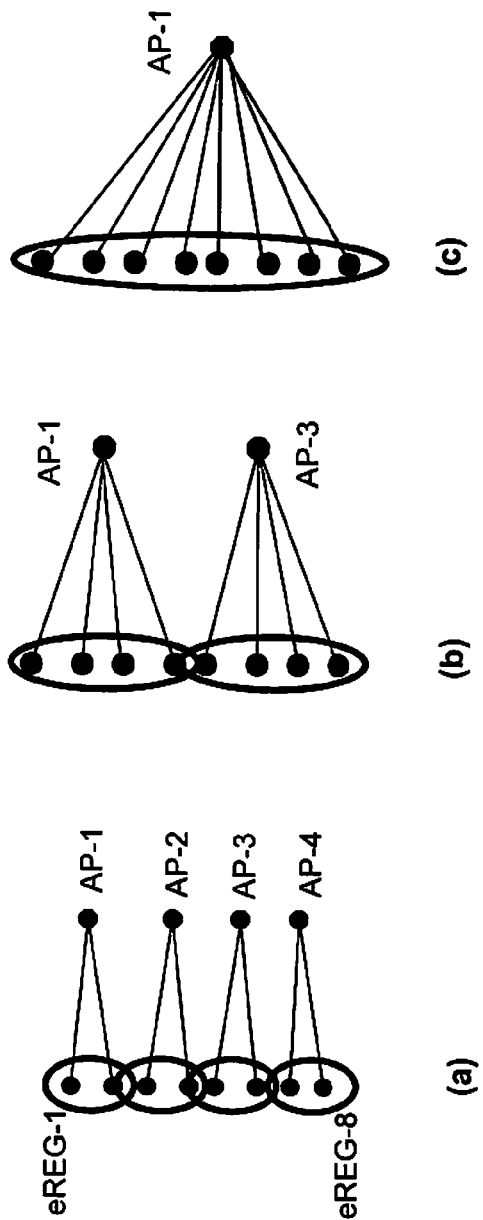
FIG. 16, FIG. 17, and FIG. 18 are schematic diagrams showing example L-type blocks of resources

FIGS. 16 (a)-(c) show three different examples of L-type blocks of resources. As in FIG. 15, the blocks may be RBs or RB pairs and each block comprises 8 eREGs. The ovals encircling the eREGs correspond to a control channel, or part of a control channel, transmitted in the block. As is seen here, the number of antenna ports used in an L-type block depends which eREGs are used for a control channel in the block. In FIG. 16 (a), two eREGs are used for a control channel, and four different control channels or partial control channels are transmitted in the block (corresponding to the four ovals). Four antenna ports are used in total. In FIG. 16(b), two control channels or partial control channels are transmitted. eREG-1 to eREG-4, belonging to the first control channel, are mapped to AP-1, and eREG-5 to eREG-8 belonging to the second control channel are mapped to AP-3. Thus, four eREGs are used for a control channel and two antenna ports are used. Finally, in FIG. 16 (c), all 8 eREGs are used for a single control channel and they are mapped to one antenna port, AP-1. Thus, in FIG. 16 (a)-(c) the antenna port to use for an eREG depends on the number of eREGs that are used for the same control channel, and on the particular subset of eREGs used. As for FIG. 15, the antenna ports to use for different numbers of eREGs and subsets of eREGs may be fixed or configurable.

It should be noted that in the case where a control channel is contained within a single block of resources, the number of eREGs used correspond to the aggregation level for the control channel. In FIG. 16(a) the aggregation level (AL) would be 1 (assuming there are two eREGs in a CCE), FIG. 16(b) would correspond to AL=2 and FIG. 16(c) would correspond to AL=4. In this special case, the antenna port to use can be said to depend on the aggregation level of the control channel.

Figure 17:
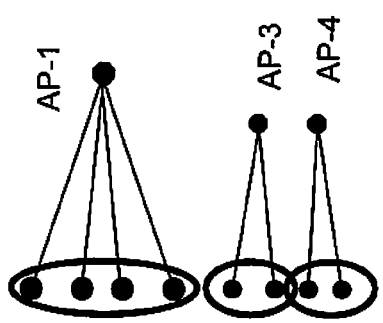

FIG. 17 illustrates an L-type block of resources where different numbers of eREGs (different AL) are used for different control channels. eREG-1 to eREG-4 belong to one control channel and use AP-1, eREG-5 and eREG-6 belong to a second control channel and use AP-3, and eREG-7 and eREG-8 belong to a third control channel and use AP-4. Also in this example, the antenna port to use for an eREG in a control channel depends on which subset of eREGs is used for the control channel.

Figure 18:
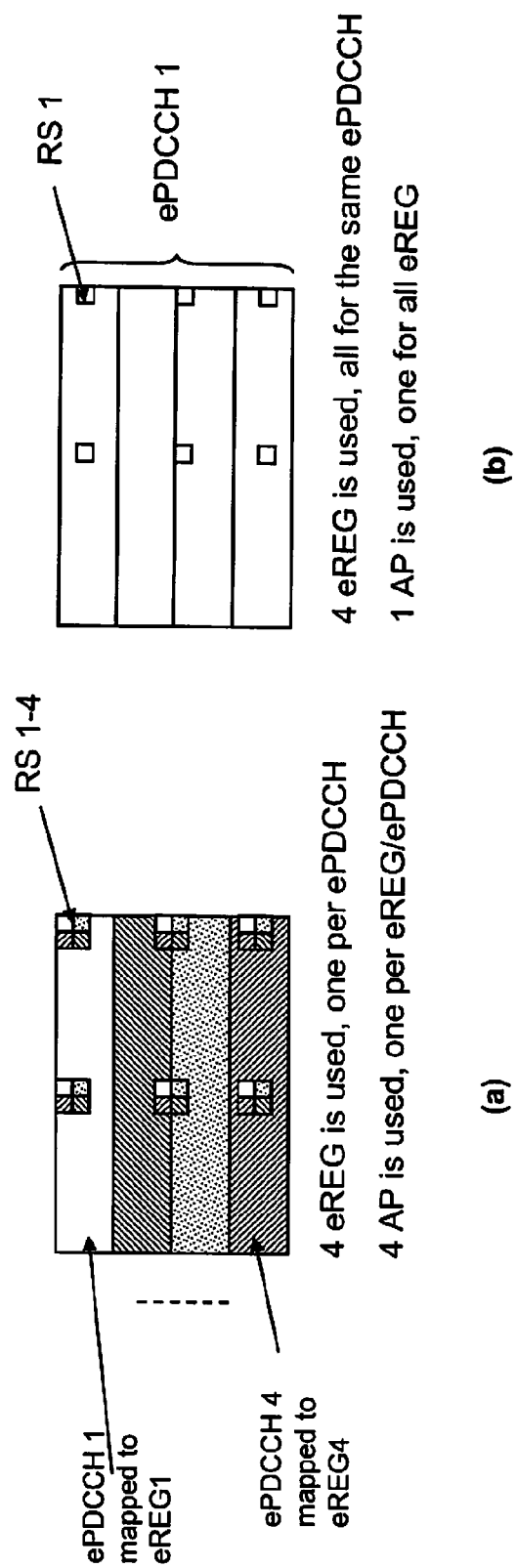

Benefits of adapting the number of antenna ports for localized transmission based on which subset of eREGs that are used for different control channels may include reduced and adaptive RS overhead, increased energy efficiency, improved channel estimation and more efficient channel estimation. FIG. 18 illustrates the improvement. In FIG. 18 (a), four ePDCCHs are comprised in a block of resources. Four antenna ports and corresponding RS are used for eREG-1 to eREG-4. In FIG. 18 (b), the same ePDCCH is transmitted in all four eREGs, and a single AP is used for all eREGs. Thus, only one single DMRS needs to be transmitted, instead of four DMRS. This also implies that the user equipment only needs to perform a single channel estimation. In contrast, if a fixed number of antenna ports (e.g. four APs) would have been used in (b), then the UE would have had to perform one channel estimation per eREG, which is less efficient. Moreover, the DMRS energy needs to be divided among the allocated AP in the block of resources which means that the channel estimation may be less accurate.

In some embodiments, the resource element groups within all blocks of resources configured for control channel transmission are categorized into two groups, wherein the first group is prioritized for L-transmission and the second group is prioritized for D-transmission. Thus, L or D categorization takes place per resource element group, instead of per block of resources (RB or RB pair). In this embodiment, it is possible to use one block of resources (e.g. one RB or RB pair) for either or both L or D transmission. Note that categorizing entire blocks of resources as L-type or D-type blocks may be viewed as a special case of this embodiment, where all resource element groups within a block of resources are prioritized for the same type of transmission. Information regarding which resource element groups are prioritized for different transmission types may be communicated from the transmitting node to the user equipment in a configuration message. Furthermore, the prioritization may change dynamically, in which case the transmitting node may send a further configuration message to the user equipment. In a variant of this embodiment, the association of eREGs to L- or D-groups is user equipment-specific.

It is further pointed out that in other embodiments, the resource element groups within all blocks of resources configured for control channel transmission are instead categorized such that some resource element groups are reserved for transmission with user-specific precoding, and other resource element groups are reserved for transmission without user-specific precoding. The mapping from eREG to AP may then be determined based on the type of the resource element group.

An advantage of this embodiment is increased flexibility, as entire PRB pairs are not tied to be either L-type or D-type as in the previous embodiment. As in the previous embodiment, D-type eREGs have a predefined association to a certain antenna port, which may be fixed or configurable by higher layers. For L-type eREGs, the antenna port depends on which subset of eREGs are used for the control channel.

FIGS. 19-25 illustrate various example PRB pairs where eREGs are prioritized for D or L transmission. It is assumed in these figures that a fixed number of antenna ports (2 APs) are used for diversity transmission. As mentioned above, this number may be configurable by higher layers. It is further assumed that there are 8 eREGs per PRB pair, and two eREGS per CCE.

Figures 19, 20:
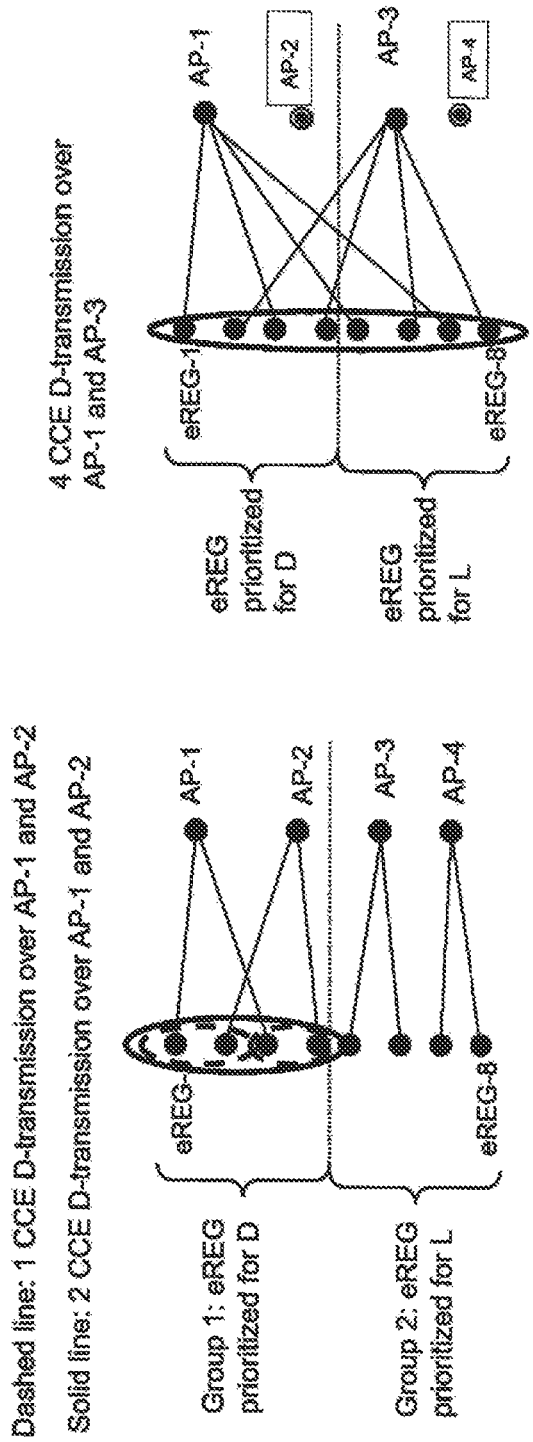
FIG. 19, FIG. 20, FIG. 21, FIG. 22, FIG. 23, FIG. 24, and FIG. 25 illustrate example PRB pairs with eREGs prioritized for L or D transmission

FIG. 19 and FIG. 20 illustrate a PRB pair which supports either 1 CCE, 2 CCE, or 4 CCE D-transmission. The upper four eREGs are prioritized for D-transmission, see FIG. 19. However, in case of a 4-CCE transmission which covers both D-type and L-type eREGs, D-transmission will be prioritized, see FIG. 20.

Figure 21:
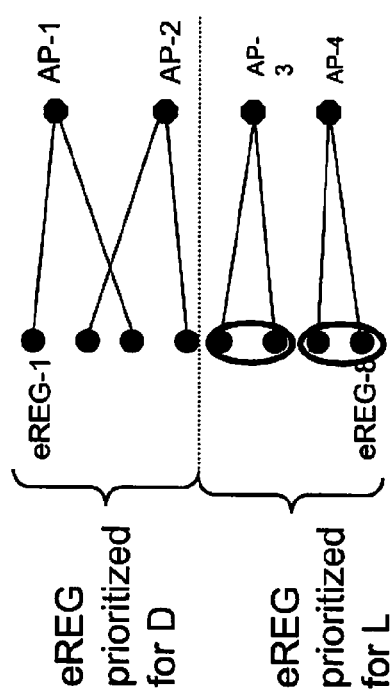
Figure 21:
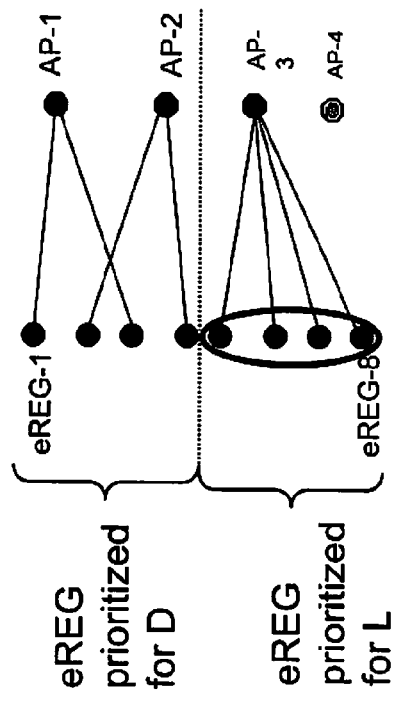
Figure 21:
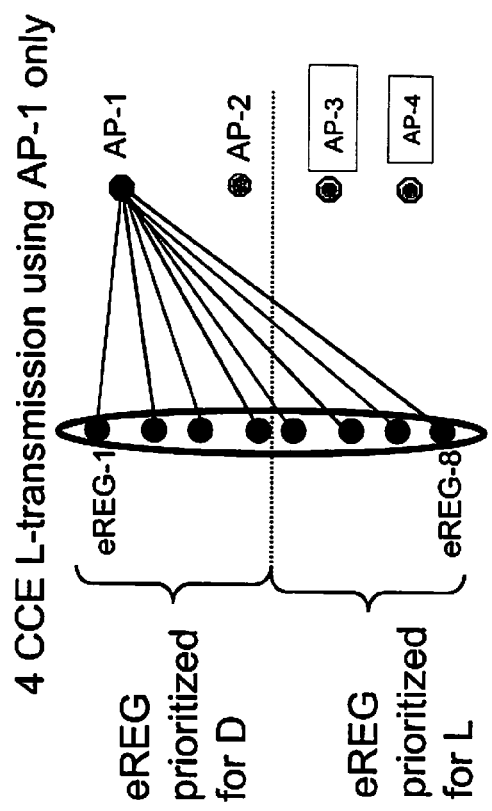

FIG. 21 shows a PRB pair supporting 2×1 CCE, 1×2 CCE, or 1×4 CCE for L-transmission. 4 AP overhead is assumed in FIG. 21(*a*), 3 AP overhead is assumed in FIG. 21(*b*), and 1 AP overhead is assumed for FIG. 21(*c*). Note that 2 AP are always reserved for diversity transmission (AP-1 and AP-2) except in the case of 4 CCE L-transmission, where the entire PRB pair is used for L-transmission. Thus, when the control channel spans both L-type and D-type eREGs, in this example L-transmission is prioritized.

Figure 22:
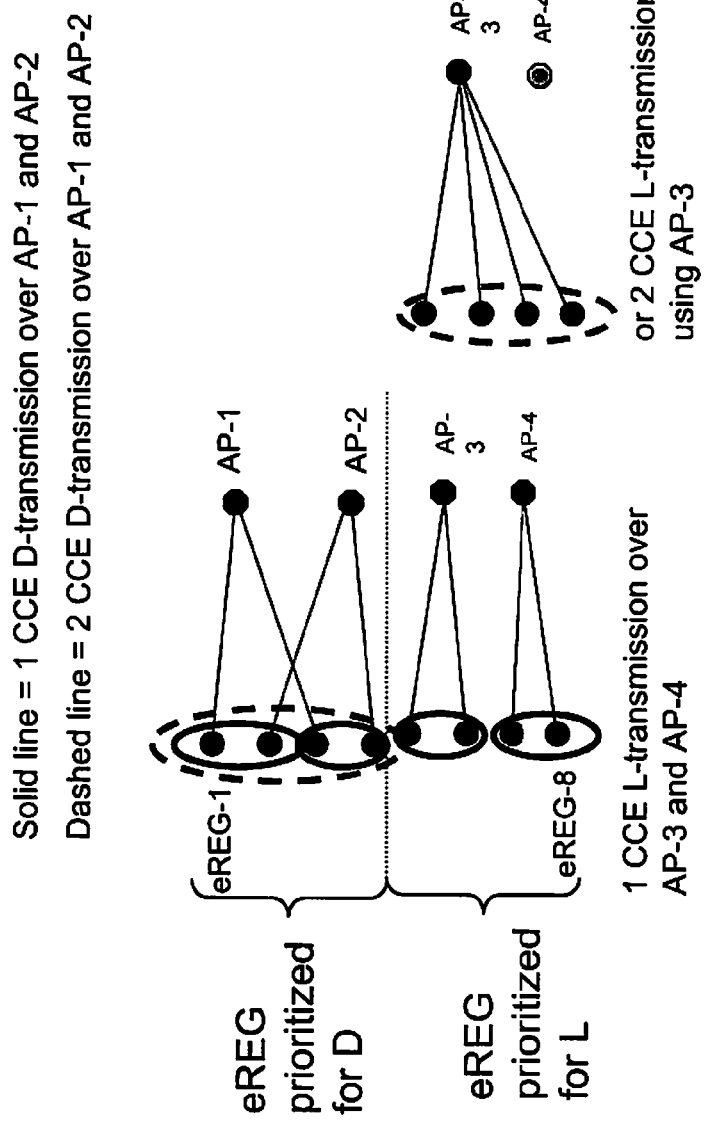

FIG. 22 shows a PRB pair being used for both L and D transmission. This may be referred to as "sharing mode". 4 AP overhead is assumed. 2 AP are used for diversity transmission, and 2 AP are used for localized transmission. As can be seen in FIG. 22, one PRB pair simultaneously supports 2×1 CCE or 1×2 CCE for D-transmission, and 2×1 CCE or 1×2 CCE for L-transmission.

Figures 23, 24:
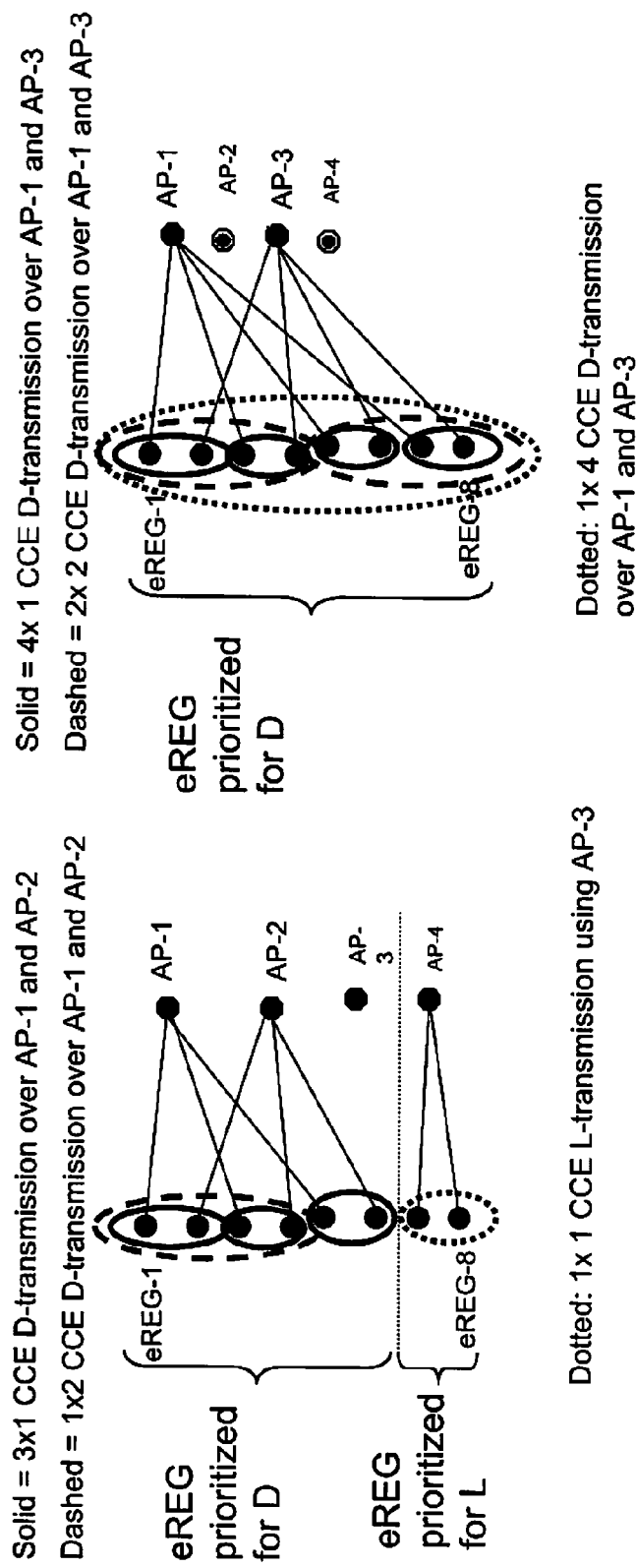
Figure 25:
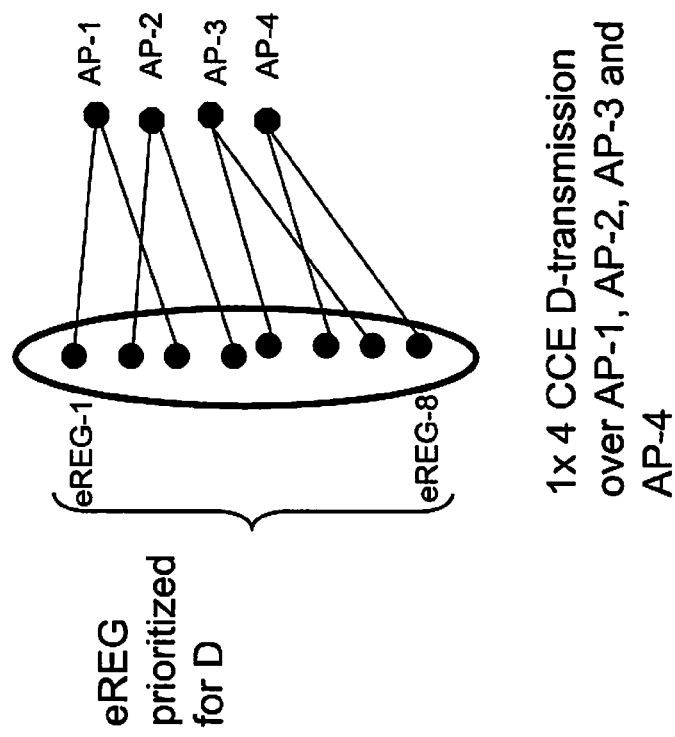

As shown in FIGS. 23-25, the number of eREGs assigned to L-type and D-type may vary, and eREGs may also be reassigned to a different category if needed.

In FIG. 23, there are fewer L-type transmissions and therefore, a larger number of eREGs are assigned to the D-type category within the PRB pair. In FIG. 24, there are no L-type transmissions, and therefore all the L-type eREGs are reassigned to D-type. As a result, there is only a 2 AP overhead compared to 4 APs in FIG. 23. FIG. 25 also shows the case where there are no L-type transmissions, and all eREGs are assigned to D-type. Note that $4^{th}$-order diversity is possible for an 1×4 CCE D-transmission. Finally, in the reverse situation where no diversity transmission is needed, it is possible to assign all eREGs to L-type. This corresponds to the situation shown in FIG. 16.

In case of a reassignment of eREGs to a different category, the UE will need to be informed, as this affects the UEs decoding assumptions in terms of which APs, and how many APs are used in a PRB pair. This may be achieved e.g. by RRC signaling from eNB to UE.

Figure 26:
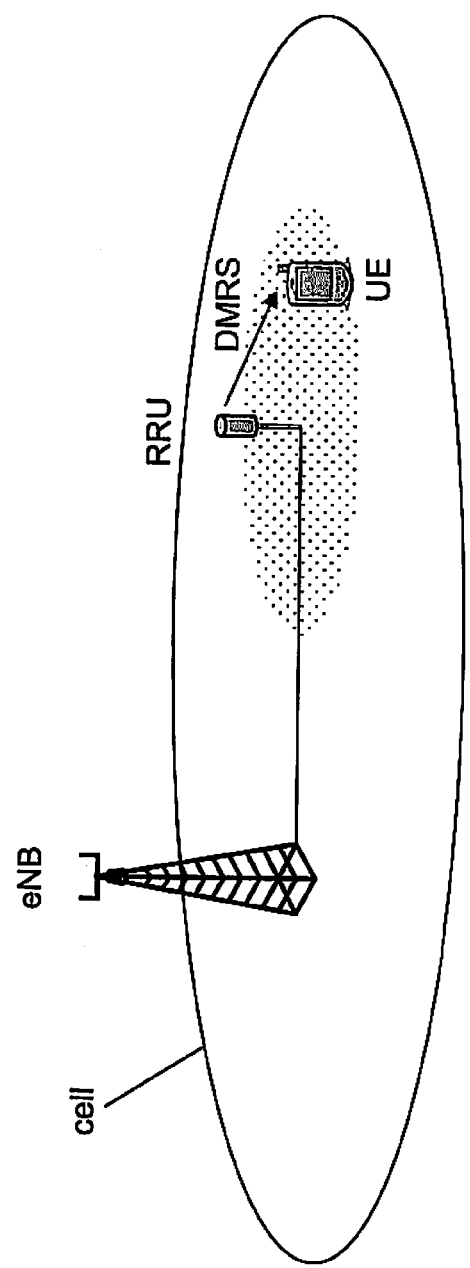
FIG. 26 is a schematic diagram showing an example wireless network

Some embodiments of the invention may be implemented in the wireless network shown in FIG. 26. This figure illustrates a RRU-based heterogeneous network scenario. A high power node such as an eNB serves a macro cell. The eNB is connected to a remote radio unit (RRU) which provides an additional coverage area (dotted region) within the macro cell. In this example, the RRU uses the same cell ID as the macro cell and therefore, the dotted region is not a separate cell. However, by using extended control channel transmission, the eNB may beamform control information to the UE within the dotted region via the RRU. Thus, extended control channel transmission provides intracell spatial reuse of resources in this example.

It is emphasized that the present invention may be used in various other scenarios as well. For example, extended control channel transmission may be beneficial in the cell expansion zone of a pico cell, where interference between the macro and pico cells makes it difficult to receive control channels such as the PDCCH, PCFICH and the PHICH. Conventional intercell interference coordination (ICIC) methods may then be used, where the pico and macro cells may be separated in the frequency domain and the ePDCCH plus ePHICH are transmitted by the low power node (pico base station) only in the frequency range reserved for the pico cell. Furthermore, it should be noted that the invention is not limited to HetNet scenarios. Beamforming of control information may for instance be beneficial if a user equipment is located on the cell border of a macro cell. In general, extended control channel transmission enables more efficient use of multiple antennas at the transmitter (e.g. eNB).

A method for configuring downlink control channel transmission for a user equipment according to some embodiments will now be described, with reference to FIG. 26 and the signaling diagram in FIG. 27. The method may be executed in a transmitting node, such as the eNB shown in FIG. 26. The method may also be executed in any other type of transmitting node equipped with multiple antennas, such as a low power node (e.g. pico base station).

The transmitting node sends a message to the user equipment which is to be configured, wherein the message indicates a set of blocks of resources that are reserved for transmission of a downlink control channel with localized transmission.

The set of blocks of resources may be indicated in several different ways, e.g. by means of a bitmap, or as an index into a predefined configuration table. As another example, the set of blocks may be indicated by an integer N, which indicating that every Nth block or resource element in the system bandwidth, or alternatively every Nth block in the search space of the user equipment, is comprised in the set. In yet another example, a range of blocks is indicated. In this case, the message may comprise a start index and an end index, indicating the range of blocks. Several ranges may also be indicated, in which case the message would comprise several start and end indices.

In one variant, the set of blocks of resources comprises only blocks that are included in a search space of the user equipment.

In particular variants, a block of resources corresponds to a PRB or a PRB pair.

The message may be sent using dedicated higher-layer signaling, e.g. as an RRC message. It is also possible to indicate the set of blocks of resources in a broadcast message, e.g. in system information. This assumes that the set of reserved blocks are the same for all user equipments served by the transmitting node.

In a variation of this embodiment, a set of resource element groups are indicated, instead of indicating blocks of resources. This corresponds to reserving resources for localized transmission on a resource element group basis. It should be noted that "reserved" in this context does not necessarily imply that a resource element group may only be used for a certain type of transmission. As was described above, in certain situations, a resource element group reserved for localized transmission may be reassigned for distributed transmission, and vice versa. Stated differently, the set of resource element groups are prioritized for, or primarily intended for localized transmission.

Another method for configuring downlink control channel transmission for a user equipment according to some embodiments will now be described, with reference to FIG. 26 and the signaling diagram in FIG. 27. This method is based on the above embodiment, but instead of indicated the blocks of resources that are reserved for localized transmission, the message indicates a set of blocks of resources, or resource element groups, that are reserved for distributed transmission.

The transmitting node sends a message to the user equipment which is to be configured, wherein the message indicates a set of blocks of resources that are reserved for distributed transmission of a downlink control channel.

The set of blocks of resources may be indicated in any of the ways described above.

In one variant, the set of blocks of resources comprises only blocks that are included in a search space of the user equipment.

In particular variants, a block of resources corresponds to a PRB or a PRB pair.

The message may be sent using RRC signaling. It is also possible to indicate the set of blocks of resources in a broadcast message, e.g. in system information. This assumes that the set of reserved blocks are the same for all user equipments served by the transmitting node. This may be more likely for distributed transmission, as this is typically used for control information directed to all user equipments or a group of user equipments.

In a variation of this embodiment, a set of resource element groups are indicated, instead of indicating blocks of resources. This corresponds to reserving resources for localized transmission on a resource element group basis.

Yet another embodiment will now be described, which is a combination of the two embodiments set forth above. Thus, in this embodiment two sets of blocks or resource element groups are indicated in the message: A first set for localized transmission, and a second set for distributed transmission. Both the first and second sets may be indicated in any of the ways mentioned above. Notably, different indication mechanisms may be used for the first and second set. For instance, the set for localized transmission may be indicated by a bitmap, whereas the set for distributed transmission may be indicated by an index or an integer N.

Figure 27:
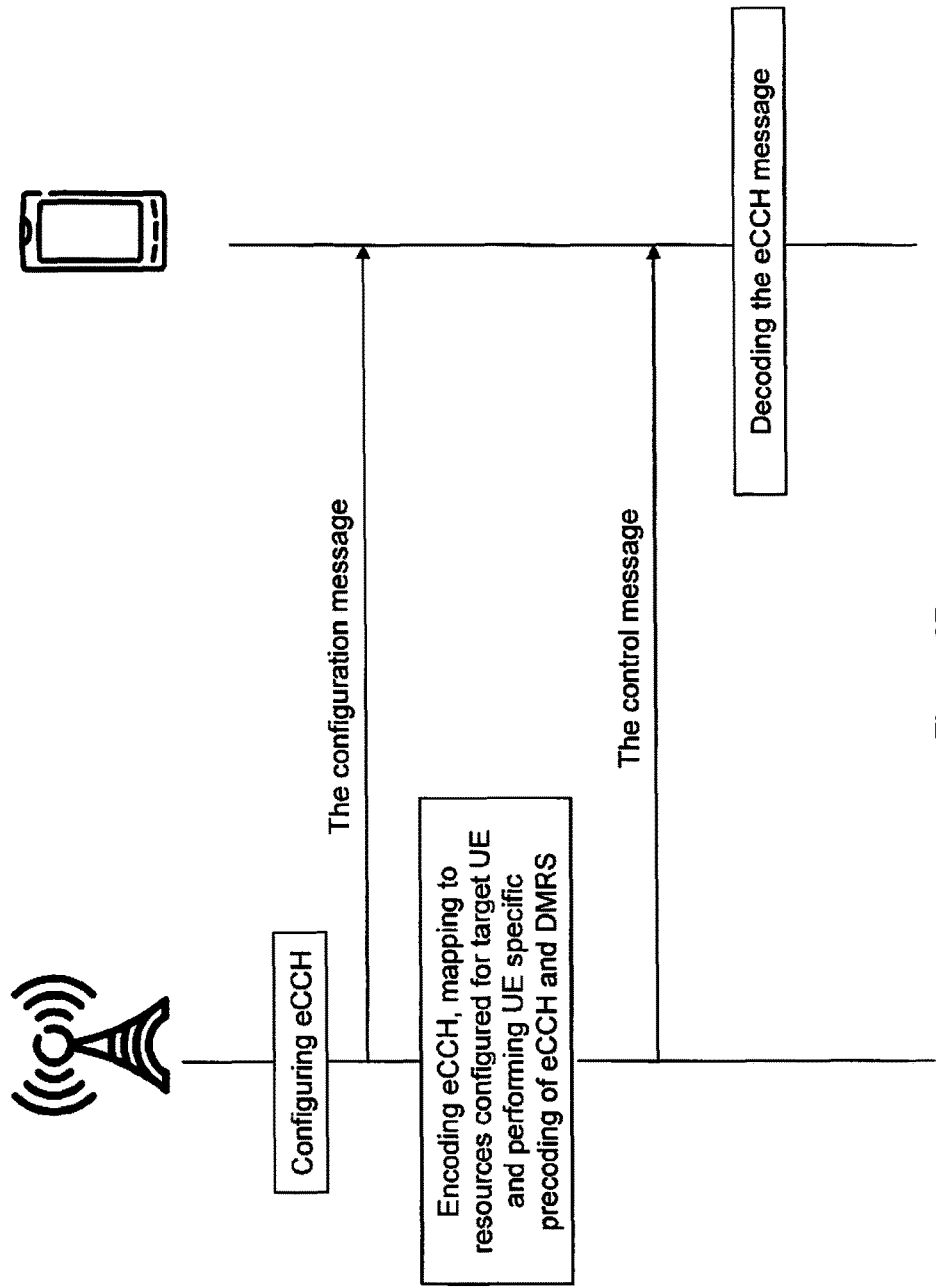
FIG. 27 is a combined signaling diagram and flowchart illustrating some embodiments

As can be seen in FIG. 27, the configuration described above may be followed by a transmission of an extended control channel, eCCH, using either localized or distributed transmission. The following embodiments will describe methods for performing the transmission. Thus, the methods described above for transmitting configuration information may be combined with any of the methods described below for transmitting or receiving an extended control channel.

A corresponding method executed in a receiving node, e.g. user equipment, receives the configuration message from the transmitting node, e.g. eNB. This enables the user equipment to take the category of a block of resources, or a resource element group, into account in its blind decoding hypothesis.

Thus, in some variants, the step of receiving the configuration message is followed by any of the methods described below for receiving an extended control channel.

Figure 28:
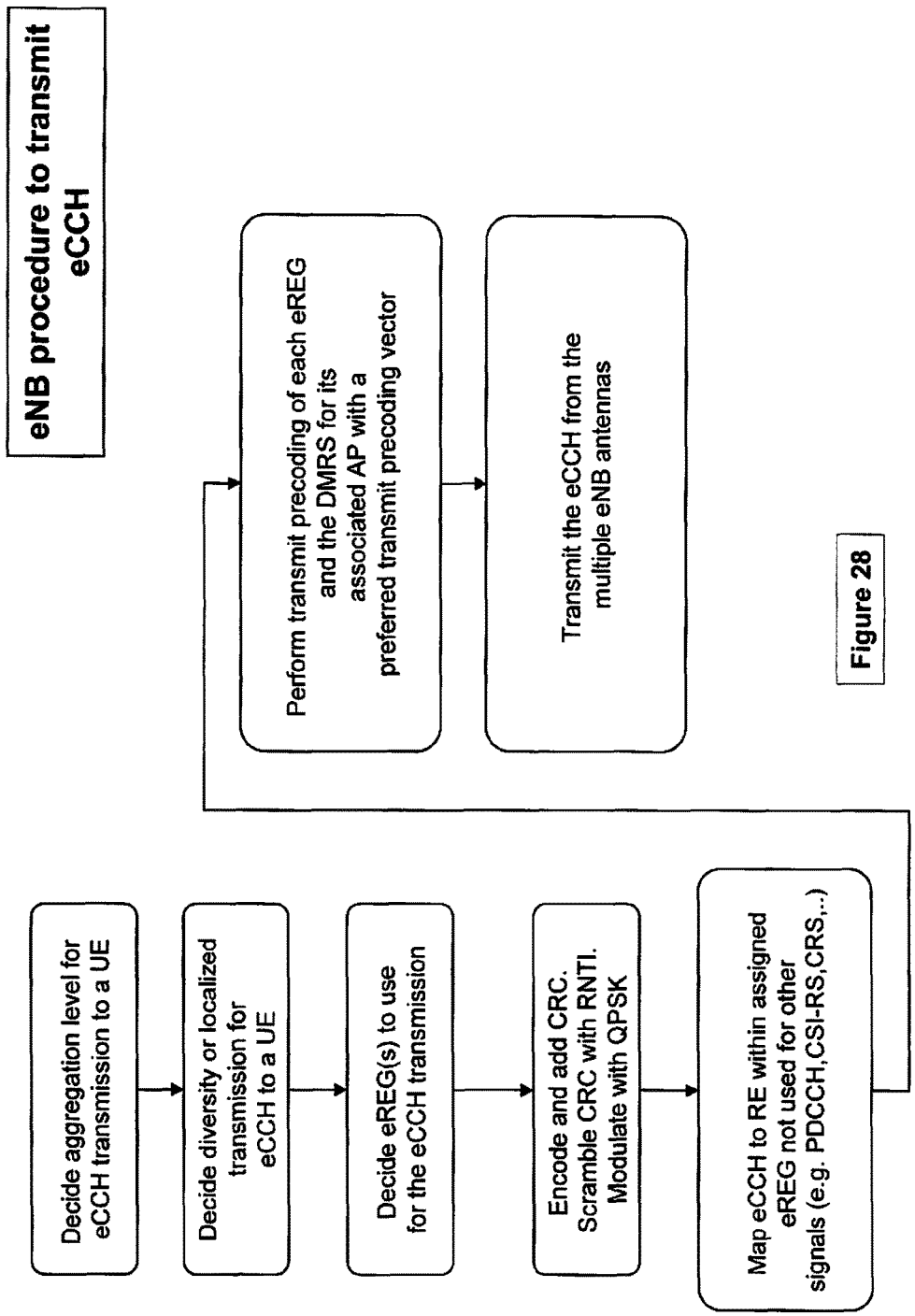
FIG. 28 and FIG. 29 are flow charts illustrating some embodiments

FIG. 28 illustrates a method in a network node, e.g. the eNB of FIG. 26, for transmitting an extended control channel.

Figure 29:
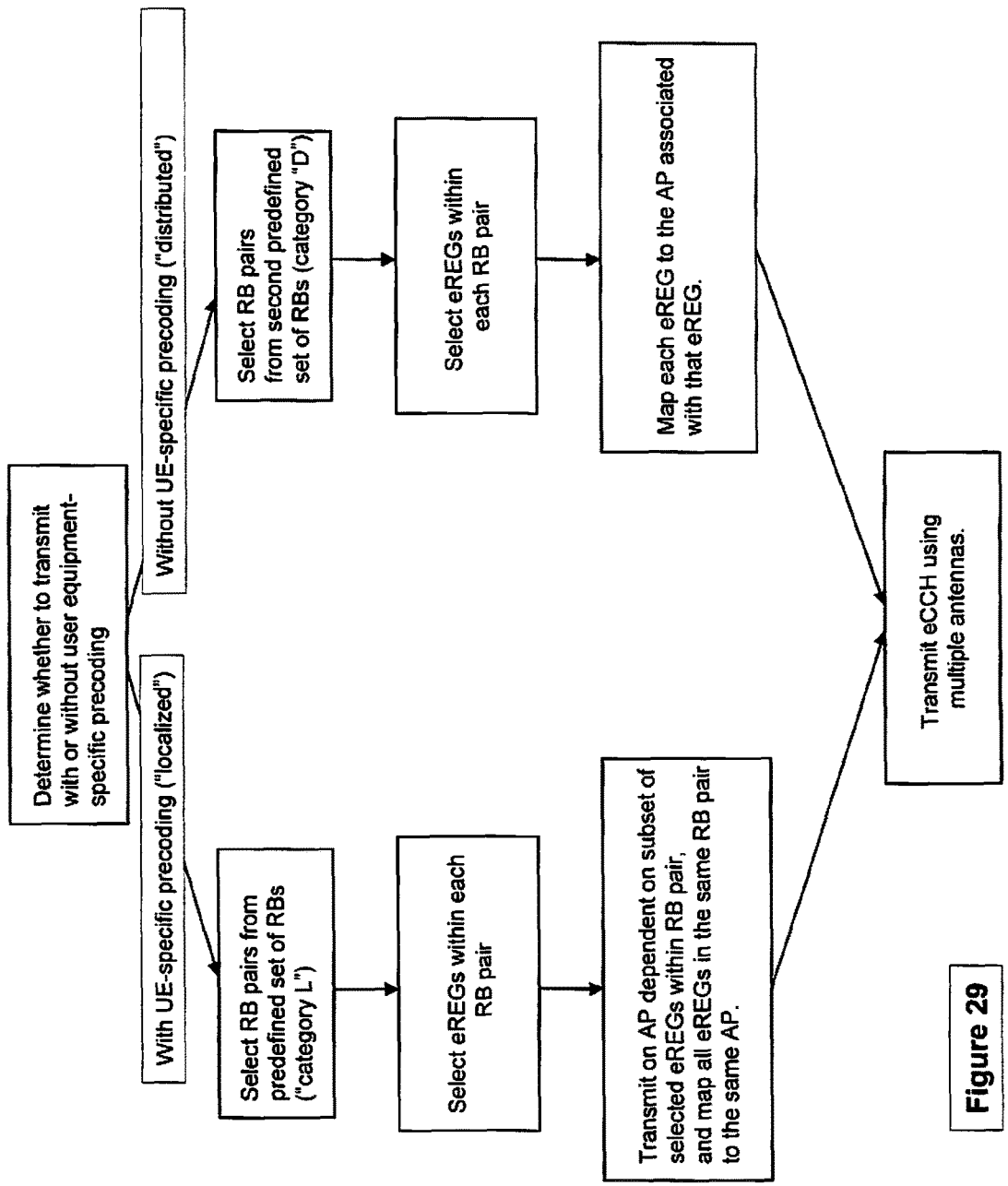

A method for transmitting an extended control channel to a UE according to an embodiment will now be described, with reference to the flowchart in FIG. 29. In this example, the method is executed by an eNB, but generally speaking the method may be executed in any transmitting node equipped with multiple antennas.

The eNB first decides whether to use localized or distributed information of the extended control channel. As above, localized transmission means that UE-specific precoding is applied, and distributed transmission means that no UE-specific precoding is applied.

We will first consider the case when the eNB decides to transmit an enhanced control channel in form of an ePDCCH to the UE by means of a localized transmission. The eNB is assumed to have knowledge of the preferred precoding vector and the downlink channel quality by channel state information feedback from the UE.

The ePDCCH scheduler in the eNB decides on the aggregation level for the ePDCCH transmission, based on the downlink channel quality to assure robust reception. If the channel quality is poor, a larger aggregation level is chosen. Then the eNB identifies the search space and the used PRB pairs the UE has been configured to monitor. The eNB then allocates the encoded and modulated ePDCCH message to one or more of the eREGs that the UE monitors for the given aggregation level.

If the ePDCCH spans multiple PRB pairs, one antenna port is selected in each PRB pair for the message. The selection is based on a pre-defined rule that when a subset of the eREG in a PRB pair is used, then a unique antenna port is assigned. Examples of such pre-defined rules are shown in FIG. 16. For instance, if the ePDCCH is using eREG-1+eREG2 in this PRB pair, then antenna port 1 (AP-1) is used. Alternatively, if eREG-5–eREG8 is used, then AP-3 is used.

The eNB then precodes the ePDCCH and the used DMRS within each used PRB pair, with the same preferred precoding vector. If the eNB has detailed precoding information available, then the used precoding vector may be different in each PRB pair, to achieve per-sub-band precoding benefits. The eNB then transmits the precoded ePDCCH and DMRS from the multiple eNB antennas.

In one alternative of the embodiment, the number of used eREGs in a PRB pair can also be used to determine the power used for the DMRS. For example, assume that AP1 and AP2 are code multiplexed over the used REs and AP3 and AP4 are code multiplexed on a different set of REs. Then if AP-1 and AP-2 are used simultaneously in the PRB pair, then ½ of the total energy per resource element (EPRE) is allocated to the DMRS associated with each AP. On the other hand, if there is no other use of these DMRS for another antenna port (as in the 8 eREG case above), then the eNB may use, and the UE may assume, full EPRE for the DMRS of the used AP.

We will now consider the case where the enhanced control channel is transmitted to the UE by means of a distributed transmission and the case where the eNB is assumed to have no knowledge of the preferred precoding vector but some knowledge of the downlink channel quality by channel state information feedback from the UE.

The ePDCCH scheduler in the eNB decides on the aggregation level for the ePDCCH transmission, based on the downlink channel quality to assure robust reception. If the channel quality is poor, a larger aggregation level is chosen. Then the eNB identifies the search space and the used PRB pairs the UE has been configured to monitor. The eNB then allocates the encoded and modulated ePDCCH message to one or more of the eREGs that the UE monitor for the given aggregation level. These eREGs are distributed over multiple PRB pairs, separated sufficiently spaced apart, so that frequency diversity is achieved.

Two antenna ports are used in each PRB pair used for the message and each eREG is using either AP-1 or the alternative AP. The alternative AP may be AP-2 and thus the corresponding DMRS are then code multiplexed with AP-2. Alternatively, AP-3 is used, which then is time-frequency multiplexed with AP-1. This has the advantage of having possibility to use the full EPRE per AP.

Figure 30:
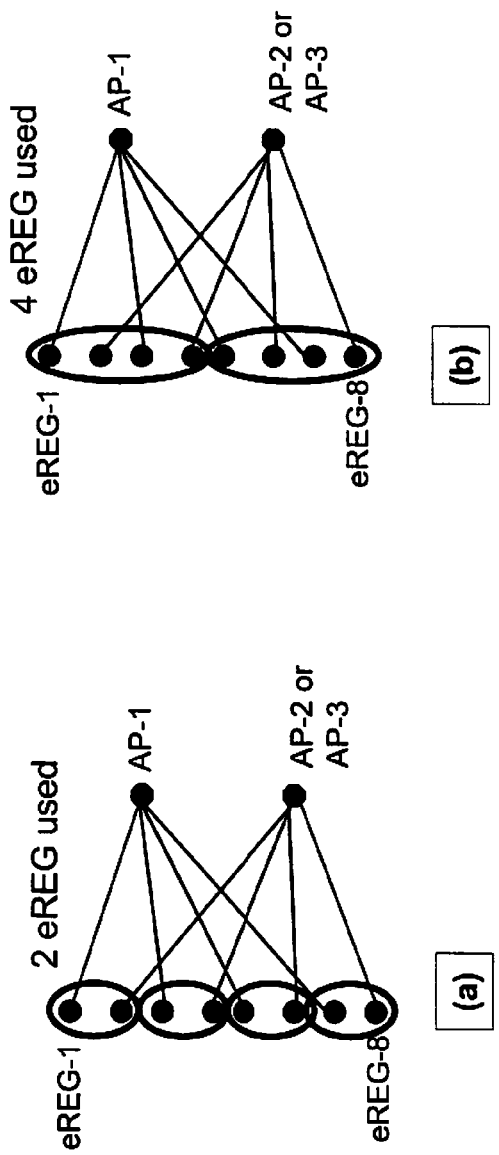
FIG. 30 shows an example association between eREGs and APs

An example association between eREGs and APs is shown in FIG. 30.

The eNB then precodes the ePDCCH and the used DMRS according to the used AP within each used PRB pair. However, since there may be multiple ePDCCH transmitted in this PRB pair, by using the remaining eREGs, and since they use the same APs, UE-specific precoding can not be used in this case. One example of a precoding vectors to use in a 2 antenna eNB case could then simply be [1 0] and [0

1] for the two AP respectively, hence mapping the first AP to the first antenna and the second AP to the second antenna. Thereby, coverage over the whole cell is achieved. The eNB then transmits the precoded ePDCCH and DMRS from the multiple eNB antennas.

In particular variants of this embodiment, the eNB selects the PRB pairs to use for the transmission from a predefined set of PRB pairs. If localized transmission is selected, the PRB pairs are chosen from a predefined set of PRB pairs which are reserved for localized transmission. Correspondingly, if distributed transmission is selected, the PRB pairs are chosen from a second predefined set of PRB pairs reserved for distributed transmission. In addition to being included in the applicable predefined set, the selected PRB pairs should also be comprised within a UE search space.

For distributed transmission, the enhanced resource element groups used for the control channel within the same PRB pair may be mapped to different antenna ports to achieve antenna diversity, particularly if the control channel is confined within a single PRB pair.

Figure 31:
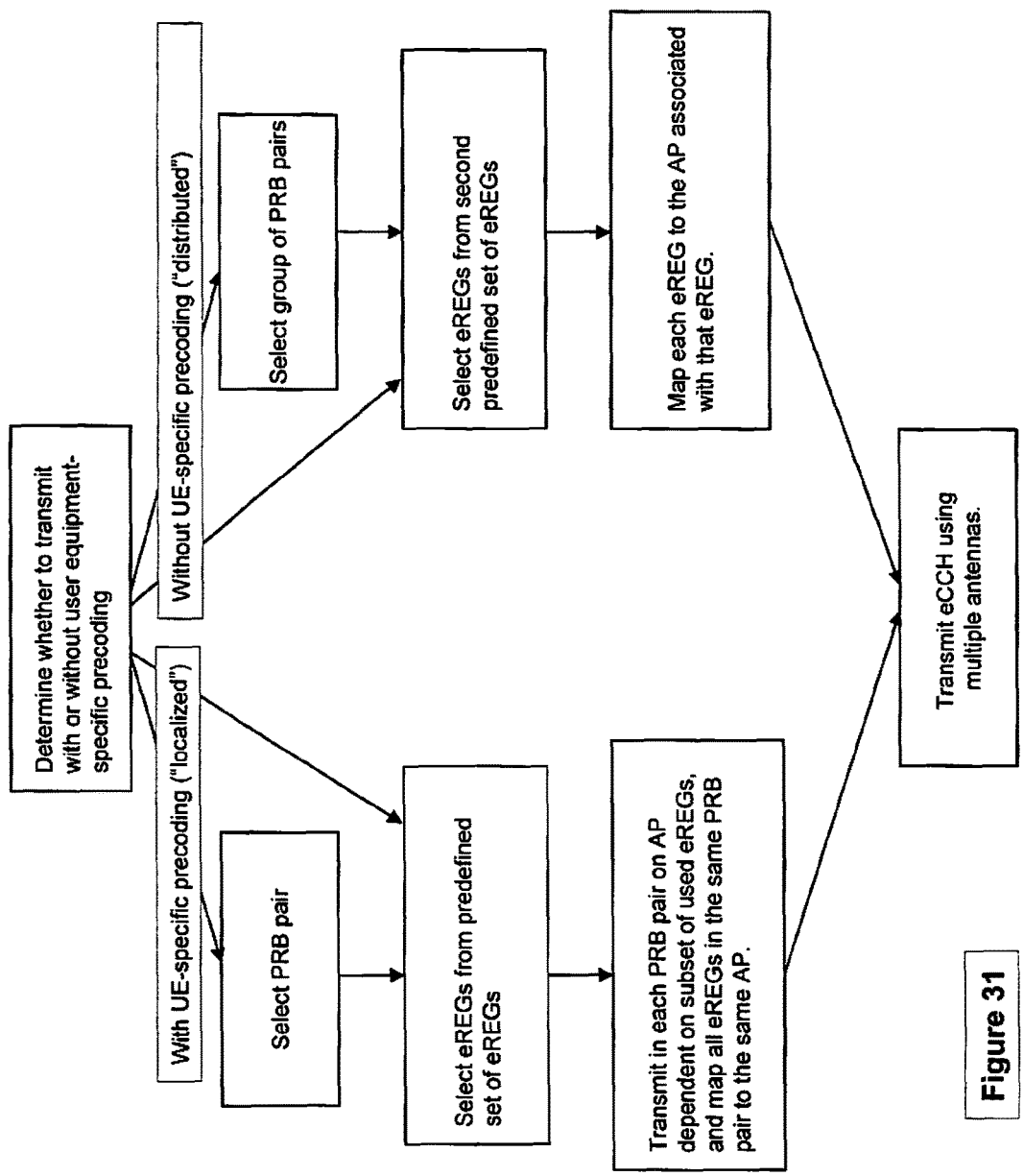
FIG. 31, FIG. 32, FIG. 33, FIG. 34, and FIG. 35 are flow charts illustrating some embodiments

In other variants of this embodiment, the eNB selects the eREGs to use for the transmission from a predefined set of eREGs. This is illustrated in FIG. 31. If localized transmission is selected, the eREGs are chosen from a predefined set of eREGs which are reserved for localized transmission. Correspondingly, if distributed transmission is selected, the eREGs are chosen from a second predefined set of eREGs reserved for distributed transmission. In addition to being included in the applicable predefined set, the selected eREGs should also be comprised within a UE search space. The eNB may select the eREGs directly, without first selecting PRB pairs, or it may start by selecting PRB pairs and then choose the eREGs within the PRB pairs that are comprised in the applicable set of reserved eREGs.

For distributed transmission, the used enhanced resource element groups within the same PRB pair may be mapped to different antenna ports to achieve antenna diversity, particularly if the control channel is confined within a single PRB pair.

In a particular variant, the eNB may select eREGs from both the first and second set for transmission of one control channel. This corresponds to reassigning certain eREGs to a different type, e.g. reassigning "L-type" eREGs to "D-type" and vice versa. This may be beneficial if only one type of transmission is needed (e.g. only localized transmission) or if there is more need for distributed than localized transmission (or vice versa).

The sets of PRB pairs or eREGs reserved for localized and distributed transmission, respectively, may be communicated to the UE in a configuration message, as described above.

Figure 32:
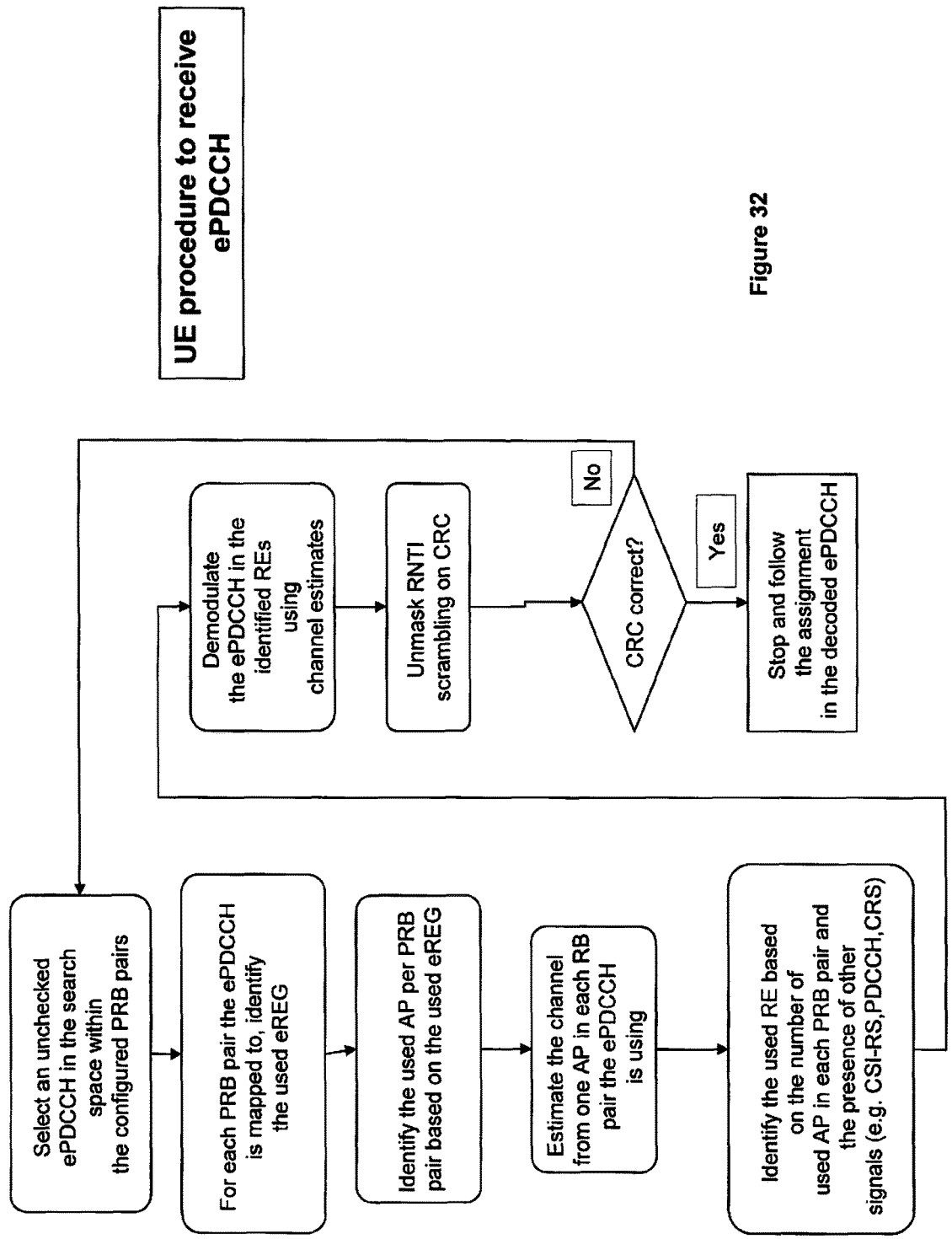
Figure 33:
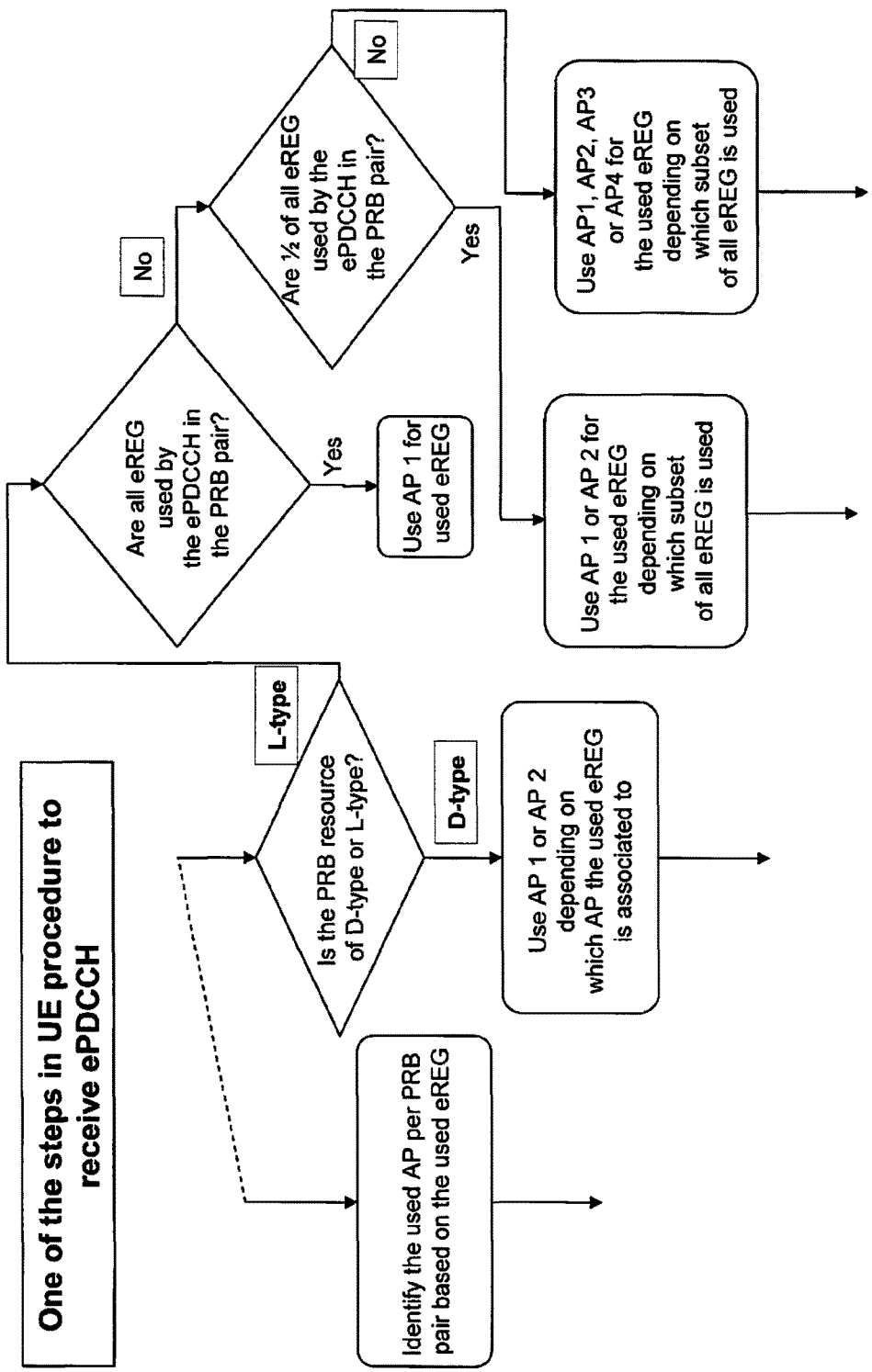

With reference to the flowcharts in FIGS. 32-33, a method in a user equipment for receiving a downlink control channel, comprising a set of enhanced resource element groups in at least one block of resources, will now be described. In this example, a block of resources (e.g. PRB or PRB pair) is designated as L-type or D-type, and based on this knowledge the UE may deduce which antenna port is used for a certain resource element group.

The UE starts by selecting a candidate set of enhanced resource element groups, corresponding to a candidate downlink control channel, from a search space configured for the user equipment. The number of CCEs in the candidate set corresponds to the aggregation level assumed by the UE in this blind decoding attempt. As mentioned above, there are typically two eREGs per CCE.

For each resource element group in the candidate set, the UE now needs to identify an antenna port which the enhanced resource element group is mapped to.

The UE first determines at least one block of resources in which the candidate set of enhanced resource element groups are comprised.

Then, the UE checks the type of one of the blocks. In other words, the UE determines if the block is comprised in a first or a second predefined set of blocks of resources, where the first predefined set is reserved for localized transmission, and the second predefined set is reserved for distributed transmission. The predefined sets may have been communicated to the UE previously in a configuration message, as described above. Alternatively, one or both sets may be hardcoded, e.g. defined in a standard document.

Responsive to determining that the block is comprised in the first predefined set of blocks of resources, the UE identifies the same antenna port for all enhanced resource element groups in that block and which belong to the candidate downlink control channel. Which antenna port is identified depends on which subset of enhanced resource element groups is used for the downlink control channel in the block of resources.

In a particular variant, the UE identifies a first antenna port (AP-1) if the candidate downlink control channel uses all enhanced resource element groups, or the first half of the enhanced resource element groups, or the first pair of enhanced resource element groups, in the block of resources. The UE identifies a second antenna port (AP-2) if the candidate downlink control channel uses the second half of the enhanced resource element groups, or the second pair of the enhanced resource element groups in the block of resources. The UE identifies a third antenna port (AP-3) if the candidate downlink control channel uses the third pair of the enhanced resource element groups in the block of resources. Finally, the UE identifies a fourth antenna port (AP-4) if the candidate downlink control channel uses the fourth pair of the enhanced resource element groups in the block of resources.

Responsive to determining that the block of resources is comprised in the second predefined set, the UE identifies the antenna ports for each enhanced resource element group comprised in the block of resources based on a predetermined mapping between enhanced resource element groups and antenna ports.

In a particular example, the UE identifies a third antenna port if the candidate downlink control channel uses half of the enhanced resource element groups in the block of resources. Otherwise, the UE identifies a third or fourth antenna port depending on which subset of the block of resources is used by the candidate downlink control channel.

A similar procedure is followed for the other blocks of resources that belong to the candidate downlink control channel. It should be noted that it is not strictly necessary to check the type of each block, since all blocks that are used for the candidate downlink control channel can be assumed to have the same type. Thus, it is possible to check the type of each block, or to check the type of only the first block and then assume the same type for the other blocks for this candidate channel.

Finally, the UE attempts to decode the candidate downlink control channel based on the estimated channel from the identified antenna port for each enhanced resource element group. The decoding process may involve several sub-steps, as shown in FIG. 32.

A block of resources may correspond to a physical resource block or a physical resource block pair.

In particular variants, the downlink control channel is frequency-multiplexed with data, and each antenna port is associated with a demodulation reference signal which is transmitted within the block of resources occupied by the corresponding enhanced resource element group. This may also be referred to as an extended or enhanced control channel.

Figure 34:
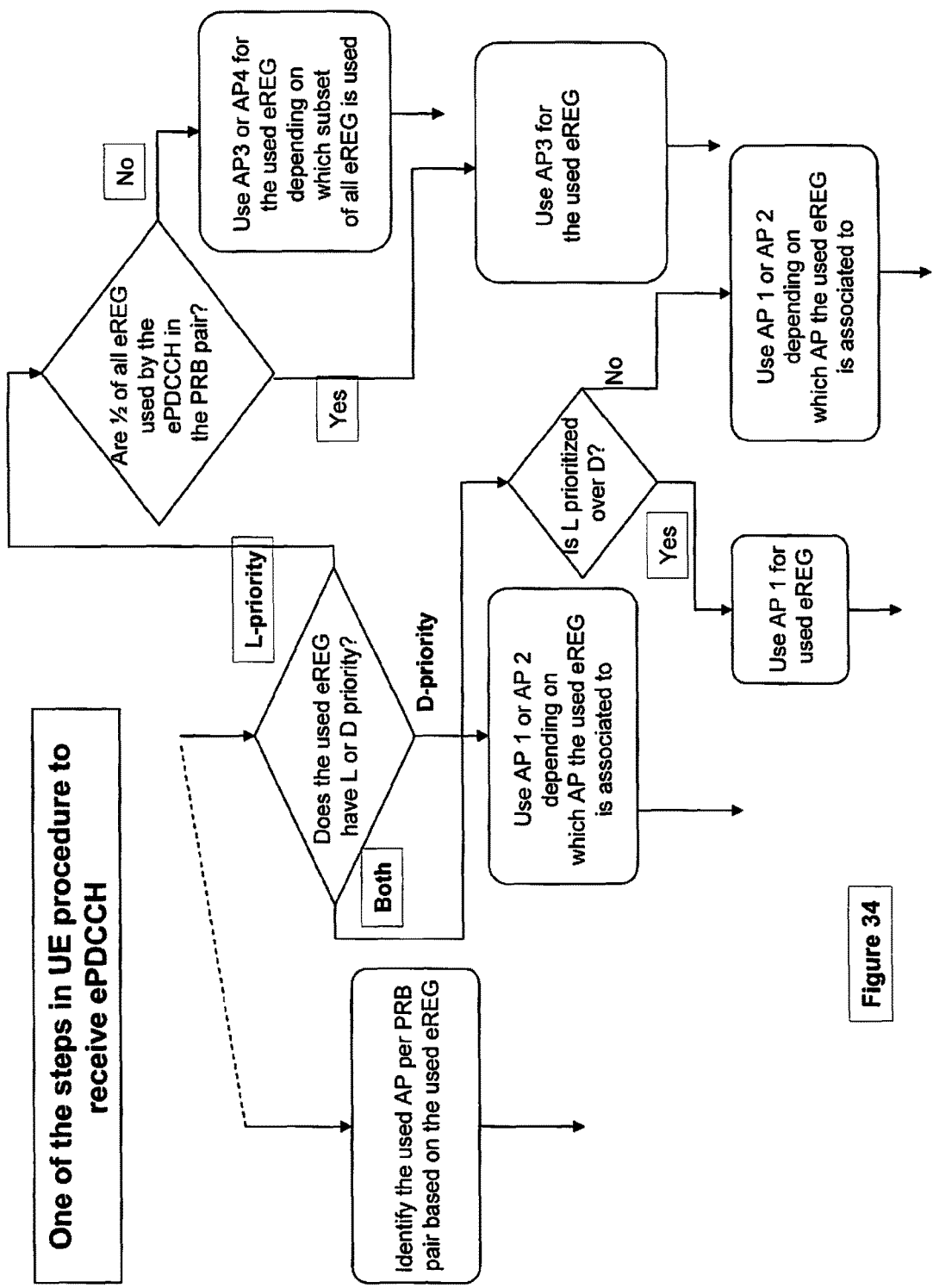

With reference to the flowcharts in FIGS. 32 and 34, a method in a user equipment for receiving a downlink control channel, comprising a set of enhanced resource element groups in at least one block of resources, will now be described.

The UE starts by selecting a candidate set of enhanced resource element groups, corresponding to a candidate downlink control channel, from a search space configured for the user equipment. The number of CCEs in the candidate set corresponds to the aggregation level assumed by the UE in this blind decoding attempt. As mentioned above, there are typically two eREGs per CCE.

For each enhanced resource element group in the candidate set, the UE now needs to identify an antenna port which the enhanced resource element group is mapped to.

The UE starts by checking the type of one of the enhanced resource element groups. In other words, the UE determines if the REG is comprised in a first or a second predefined set of blocks of REGs, where the first predefined set is reserved or prioritized for localized transmission, and the second predefined set is reserved or prioritized for distributed transmission. The predefined sets may have been communicated to the UE previously in a configuration message, as described above. Alternatively, one or both sets may be hardcoded, e.g. defined in a standard document.

Responsive to determining that the enhanced resource element group is comprised in the first predefined set, the UE determines the block of resources the enhanced resource element group is comprised in. Then, the UE identifies the antenna ports for the enhanced resource element group based on which subset of enhanced resource element groups in the block that is used for the candidate downlink control channel.

In a particular example, the UE identifies a first antenna port if the candidate downlink control channel uses all enhanced resource element groups, or the first half of the enhanced resource element groups, or the first pair of enhanced resource element groups, in the block of resources. Otherwise, the UE identifies a second antenna port if the candidate downlink control channel uses the second half of the enhanced resource element groups, or the second pair of the enhanced resource element groups in the block of resources. Otherwise, the UE identifies a third antenna port if the candidate downlink control channel uses the third pair of the enhanced resource element groups in the block of resources. Finally, the UE identifies a fourth antenna port if the candidate downlink control channel uses the fourth pair of the enhanced resource element groups in the block of resources.

Responsive to determining that the enhanced resource element group is comprised in the second predefined set, the UE identifying the antenna port for the resource element group based on a predetermined mapping between enhanced resource element groups and antenna ports.

In a particular example, the UE identifies a third antenna port if the candidate downlink control channel uses half of the enhanced resource element groups in the block of resources. Otherwise, the UE identifies a third or fourth antenna port depending on which subset of the block of resources is used by the candidate downlink control channel.

A similar procedure is followed for the other REGs that belong to the candidate downlink control channel. It should be noted that it is not strictly necessary to check the type of each REG, since all REGs that are used for the candidate downlink control channel can be assumed to have the same type. Thus, it is possible to check the type of each REG, or to check the type of only the first REG and then assume the same type for the other REGs for this candidate channel.

Finally, the UE attempts to decode the candidate downlink control channel based on the estimated channel from the identified antenna port for each resource element group. The decoding process may involve several sub-steps, as shown in FIG. 32.

A block of resources may correspond to a physical resource block or a physical resource block pair.

In particular variants, the downlink control channel is frequency-multiplexed with data, and each antenna port is associated with a demodulation reference signal which is transmitted within the block of resources occupied by the corresponding resource element group. This may also be referred to as an extended or enhanced control channel.

Figure 35:
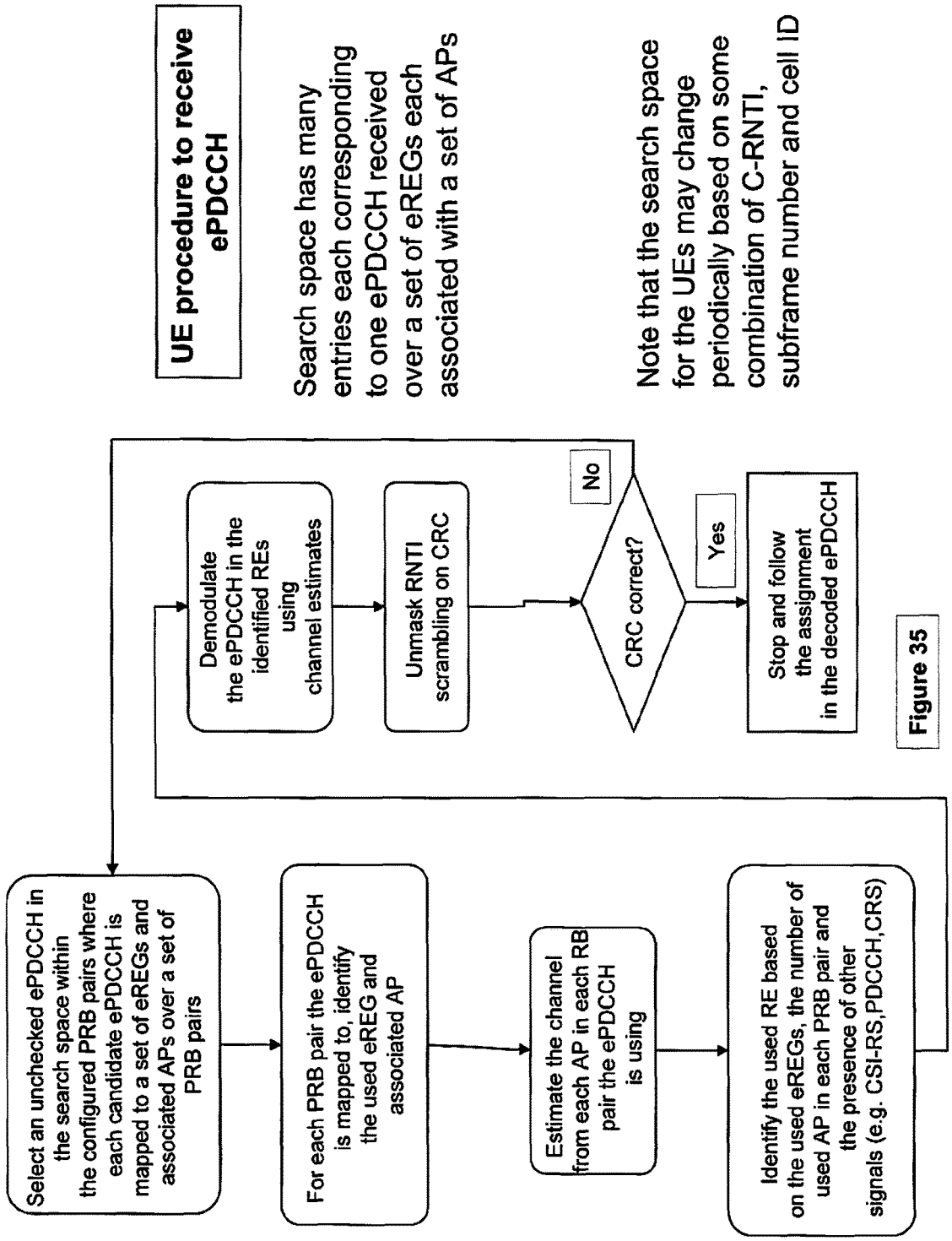

In a further embodiment, illustrated in FIG. 35, the UE does not need to determine the AP for each eREG based on rules, as in the previous embodiments. Instead, the PRB pairs, the eREGs used within the PRB pairs, and the associated antenna ports are already defined for each candidate ePDCCH being searched as part of the ePDCCH candidate definition.

When attempting to decode a downlink control channel, the UE has a list of ePDCCH candidates in its search space that it needs to check Each candidate ePDCCH is composed of a set of PRB/eREG/AP mappings. For example, a UE may have one candidate ePDCCH with AL=2 with the search set [(PRB1, eREG1, AP1), (PRB1, eREG2, AP2)].

The UE then simply searches over each of its candidate ePDCCHs.

Additionally, the list of ePDCCH candidates for a UE may change in some pseudo-random fashion to avoid collisions.

Note that if a UE's list contains a candidate ePDCCH where two elements of its set contains the same eREG mapped to multiple APs, this implicitly signals multi-layer transmission. An AL=2 example would be [(PRB1, eREG1, API), (PRB1, eREG1, AP2)]. Here, AP1 and AP2 are both assigned to eREG1 thus implicitly signaling to the UE that multi-layer transmission is being used on this eREG.

Although the described solutions may be implemented in any appropriate type of telecommunication system supporting any suitable communication standards and using any suitable components, particular embodiments of the described solutions may be implemented in an LTE network, such as that illustrated in FIG. 26.

The example network may further include any additional elements suitable to support communication between wireless devices or between a wireless device and another communication device (such as a landline telephone). Although the illustrated wireless device may represent a communication device that includes any suitable combination of hardware and/or software, this wireless device may, in particular embodiments, represent a device such as the example wireless device 900 illustrated in greater detail by FIG. 37. Similarly, although the illustrated network node may represent a network nods that includes any suitable combination of hardware and/or software, this network nodes may, in particular embodiments, represent a device such as the example network node 800 illustrated in greater detail by FIG. 36.

Figure 37:
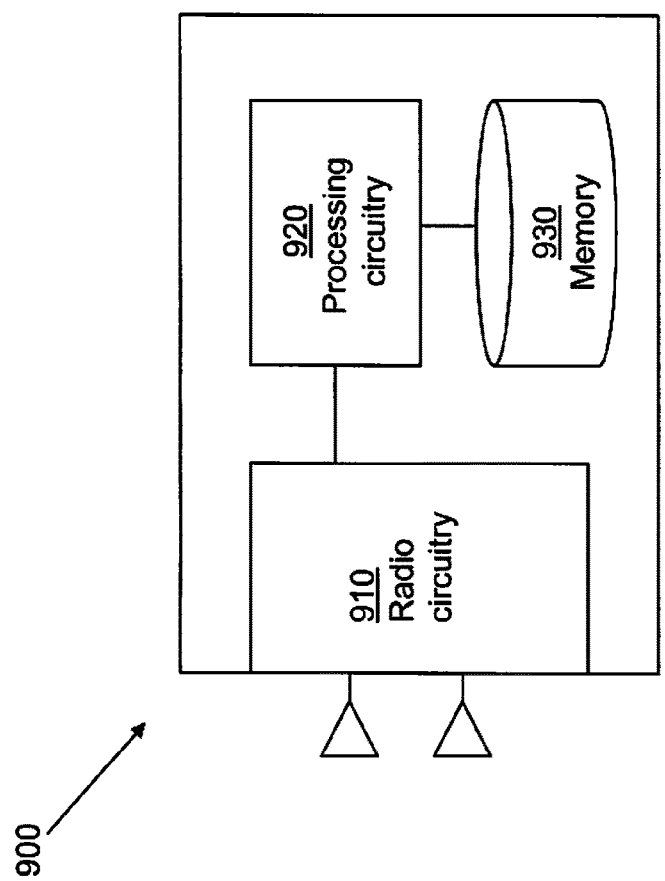
FIG. 37 is a block diagram illustrating an example wireless device

As shown in FIG. 37, the example wireless device 900 includes processing circuitry 920, a memory 930, radio circuitry 910, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 920 executing instructions stored on a computer-readable medium, such as the memory 930 shown in FIG. 37. Alternative embodiments of the wireless device 900 may include additional components beyond those shown in FIG. 37 that may be responsible for providing certain aspects of the wireless device's functionality, including any of the functionality described above and/or any functionality necessary to support the solution described above.

Figure 36:
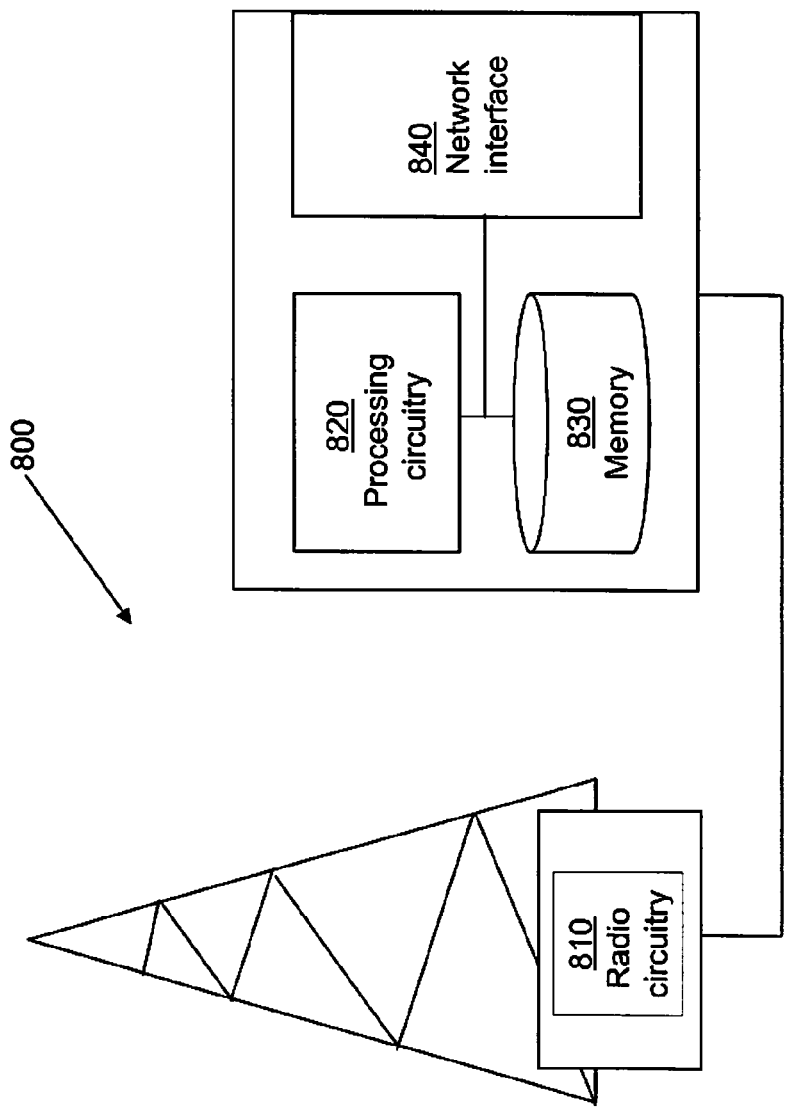
FIG. 36 is a block diagram illustrating an example network node

As shown in FIG. 36, the example network node 800 includes processing circuitry 820, a memory 830, radio circuitry 810, and at least one antenna. The processing circuitry 820 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 820 executing instructions stored on a computer-readable medium, such as the memory 830 shown in FIG. 36. Alternative embodiments of the network node 800 may include additional components responsible for providing additional functionality, including any of the functionality identified above and/or any functionality necessary to support the solution described above.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention.

Some embodiments provide a method for transmitting a downlink control channel in at least one block of resources, wherein the downlink control channel comprises a set of resource element groups. The method comprises determining whether to perform the transmission using user equipment-specific precoding, or without user equipment-specific precoding, and, responsive to determining to perform the transmission using user equipment-specific precoding, performing the transmission such that all resource element groups in the set that are comprised in the same block of resources are mapped to the same antenna port, and the antenna port depends on which subset of resource element groups in the block of resources are used for the downlink control channel.

The set of resource element groups to use for the transmission may, in some variants, be selected from a predefined first set of resource element groups. In these variants, at least one of the resource element groups to use for the transmission may be selected from a predefined second set of resource element groups.

Optionally, the method further comprises selecting at least one block of resources, and selecting, within each selected block of resources, a set of resource element groups to use for the transmission of the downlink control channel. The at least one block of resources may be selected from a predefined first set of blocks of resources.

In some variants, the antenna port depends on the number of resource element groups in the block of resources that are used for the downlink control channel, and on the location of the resource element groups within the block of resources that are used for the downlink control channel.

Optionally, the method may further comprise the step of, responsive to determining to perform the transmission without user equipment-specific precoding, transmitting the downlink control channel such that each resource element group in the set is mapped to an antenna port which is associated with that resource element group according to a predetermined mapping. In some variants, the method further comprises selecting at least one block of resources, and selecting, within each selected block of resources, a set of resource element groups to use for the transmission of the downlink control channel. Yet further, these variants may comprise selecting the at least one blocks of resources from a predefined second set of blocks of resources. It is also possible to select resource element groups to use for the transmission from a predefined second set of resource element groups, and to select at least one resource element group to use for the transmission from the predefined first set of resource element groups.

The method may further comprise selecting an aggregation level for the downlink control channel, wherein the aggregation level corresponds to the number of resource element groups to use for transmitting the downlink control channel, to perform transmit precoding of each resource element group in the set and of the reference signal for the antenna port that the resource element group is mapped to, and to transmit the downlink control channel via multiple transmit antennas.

The resource element groups to use for the transmission may be selected from the resource element groups comprised in a search space of the one or more user equipments to which the transmission is directed.

Some embodiments provide a transmitting node for transmitting a downlink control channel in at least one resource block, wherein the downlink control channel comprises a set of resource element groups, the transmitting node comprising radio circuitry and processing circuitry. The processing circuitry is configured to determine whether to perform the transmission using user equipment-specific precoding, or without user equipment-specific precoding, and, responsive to determining to perform the transmission using user equipment-specific precoding, perform the transmission, via the radio circuitry, such that all resource element groups in the set that are comprised in the same resource block or resource block pair are mapped to the same antenna port, and the antenna port depends on which resource element groups are comprised in the resource block or resource block pair.

The invention claimed is:

1. A method, in a transmitting node, for transmitting a downlink control channel in at least one block of resources, wherein the downlink control channel comprises a set of resource element groups, the method comprising:
   determining whether to use localized transmission or to use distributed transmission to transmit the downlink control channel; and
   responsive to determining to use localized transmission, performing the transmission of the downlink control channel such that, for each block of resources used for the transmission, all resource element groups that are in the block of resources and that are in the set of resource element groups used for the downlink control channel are mapped to one of a plurality of antenna ports, and such that the antenna port to which the resource element groups used for the downlink control channel in the block of resources are mapped depends on which subset of resource element groups in the block of resources are used for the downlink control channel and further depends on how many resource element groups, in the block of resources, are used for the downlink control channel, and on the location of the resource element groups within the block of resources that are used for the downlink control channel.

2. The method of claim 1, wherein a block of resources is a physical resource block or a physical resource block pair.

3. The method of claim 1, wherein the downlink control channel is frequency-multiplexed with data, and wherein each antenna port is associated with a demodulation reference signal that is transmitted within the block of resources occupied by the corresponding resource element group.

4. The method of claim 1, further comprising:
selecting at least one block of resources; and
selecting, within each selected block of resources, a set of resource element groups to use for the transmission of the downlink control channel.

5. The method of claim 4, further comprising selecting the at least one block of resources from a predefined first set of blocks of resources.

6. The method of claim 1, further comprising selecting resource element groups to use for the transmission from a predefined first set of resource element groups.

7. The method of claim 6, further comprising selecting at least one of the resource element groups to use for the transmission from a predefined second set of resource element groups.

8. The method of claim 1, further comprising:
selecting an aggregation level for the downlink control channel, wherein the aggregation level corresponds to the number of resource element groups to use for transmitting the downlink control channel;
performing transmit precoding of each resource element group in the set and of the reference signal for the antenna port that the resource element group is mapped to; and
transmitting the downlink control channel via multiple transmit antennas.

9. The method of claim 1, further comprising selecting the resource element groups to use for the transmission from the resource element groups comprised in a search space of one or more user equipments to which the transmission is directed.

10. A transmitting node for transmitting a downlink control channel in at least one resource block or resource block pair, wherein the downlink control channel comprises a set of resource element groups, the transmitting node comprising radio circuitry and processing circuitry, wherein the processing circuitry is configured to:
determine whether to use localized transmission or to use distributed transmission to transmit the downlink control channel; and
responsive to determining to use localized transmission, perform the transmission of the downlink control channel, via the radio circuitry, such that, for each resource block or resource block pair used for the transmission, all resource element groups that are in the resource block or resource block pair and that are in the set of resource element groups used for the downlink control channel are mapped to one of a plurality of antenna ports, and such that the antenna port to which the resource element groups in any resource block or resource block pair used for the transmission are mapped depends on which resource element groups used for the downlink control channel are comprised in the resource block or resource block pair and further depends on how many resource element groups in the block of resources are used for the downlink control channel, and on the location of the resource element groups within the block of resources that are used for the downlink control channel.

11. A method in a user equipment for receiving a downlink control channel in at least one resource block, wherein the downlink control channel comprises a set of resource element groups, the method comprising:
selecting a candidate set of resource element groups, corresponding to a candidate downlink control channel, from a search space configured for the user equipment;
for each resource element group in the candidate set, identifying an antenna port the resource element group is mapped to, based on the resource element group; and
attempting to decode the downlink control channel based on an estimated channel for the identified antenna port for each resource element group;
wherein the step of identifying an antenna port further comprises:
identifying at least one block of resources in which the resource element groups of the candidate set of resource element groups are comprised; and,
responsive to determining that a block of resources containing resource element groups of the candidate set of resource element groups is comprised in a first predefined set of blocks of resources, identifying the same antenna port for all resource element groups in the set that are comprised in the block of resources, where the identified antenna port depends on which subset of resource element groups is used for the downlink control channel in the block of resources and further depends on how many resource element groups in the block of resources are used for the downlink control channel, and on the location of the resource element groups within the block of resources that are used for the downlink control channel.

12. The method of claim 11, further comprising:
identifying a first antenna port if the candidate downlink control channel uses all resource element groups, or a first half of the resource element groups, or a first pair of resource element groups, in the block of resources; or
identifying a second antenna port if the candidate downlink control channel uses a second half of the resource element groups, or a second pair of the resource element groups in the block of resources, the second half differing from the first half and the second pair differing from the first pair; or
identifying a third antenna port if the candidate downlink control channel uses a third pair of the resource element groups in the block of resources, the third pair differing from the first and second pairs; or
identifying a fourth antenna port if the candidate downlink control channel uses a fourth pair of the resource element groups in the block of resources, the fourth pair differing from the first, second, and third pairs.

13. The method of claim 11, wherein the step of identifying an antenna port the resource element group is mapped to further comprises, responsive to determining that the block of resources is comprised in a second predefined set of blocks of resources, identifying the antenna ports for each resource element group comprised in the block of resources based on a predetermined mapping between resource element groups and antenna ports.

14. The method of claim 11, wherein the step of identifying an antenna port the resource element group is mapped to further comprises, responsive to determining that the resource element group is comprised in a first predefined set of resource element groups, identifying the block of resources the resource element group is comprised in, and identifying the antenna port for the resource element group based on which resource element groups are comprised in the same block of resources, and comprised in the first predefined set of resource element groups, and comprised in the candidate set.

15. The method of claim 14, further comprising:
identifying a third antenna port if the candidate downlink control channel uses half of the resource element groups in the block of resources; or
identifying a third or fourth antenna port depending on which subset of the block of resources are used by the candidate downlink control channel.

16. The method of claim 11, wherein the step of identifying an antenna port further comprises, responsive to determining that the resource element group is comprised in a second predefined set of resource element groups, identifying the antenna ports for the resource element group that is comprised in the block of resources based on a predetermined mapping between resource element groups and antenna ports.

17. A receiving node for receiving a downlink control channel in at least one resource block, wherein the downlink control channel comprises a set of resource element groups, the receiving node comprising radio circuitry and processing circuitry, wherein the processing circuitry is configured to:
select a candidate set of resource element groups, corresponding to a candidate downlink control channel, from a search space configured for the receiving node;
for each resource element group in the candidate set, identify an antenna port the resource element group is mapped to, based on the resource element group; and
attempt to decode the downlink control channel based on the estimated channel from the identified antenna port for each resource element group;
wherein the processing circuitry is configured to identify the antenna port for each resource element group in the candidate set by:
identifying at least one block of resources in which the resource element groups of the candidate set of resource element groups are comprised; and,
responsive to determining that a block of resources containing resource element groups of the candidate set of resource element groups is comprised in a first predefined set of blocks of resources, identifying the same antenna port for all resource element groups in the set that are comprised in the block of resources, where the identified antenna port depends on which subset of resource element groups is used for the downlink control channel in the block of resources and further depends on how many resource element groups in the block of resources are used for the downlink control channel, and on the location of the resource element groups within the block of resources that are used for the downlink control channel.

* * * * *

UNITED STATES PATENT AND TRADEMARK OFFICE
CERTIFICATE OF CORRECTION

PATENT NO. : 9,930,648 B2  
APPLICATION NO. : 13/701584  
DATED : March 27, 2018  
INVENTOR(S) : Frenne et al.

Page 1 of 1

It is certified that error appears in the above-identified patent and that said Letters Patent is hereby corrected as shown below:

In the Specification

In Column 3, Line 25, delete "of HARQ" and insert -- of physical HARQ --, therefor.

In Column 3, Lines 27-28, delete "the control" and insert -- the physical control --, therefor.

In Column 4, Lines 22-23, delete "shared data channel" and insert -- shared channel --, therefor.

In Column 7, Line 55, delete "FIG. 20 is intentionally omitted.".

In Column 9, Line 42, delete "a 30 fewer" and insert -- a fewer --, therefor.

In Column 14, Line 65, delete "eREGS" and insert -- eREGs --, therefor.

In Column 22, Line 44, delete "API)," and insert -- AP1), --, therefor.

Signed and Sealed this  
Twenty-first Day of July, 2020

Andrei Iancu  
*Director of the United States Patent and Trademark Office*